United States Patent
Murray et al.

(10) Patent No.: US 6,330,653 B1
(45) Date of Patent: Dec. 11, 2001

(54) MANIPULATION OF VIRTUAL AND LIVE COMPUTER STORAGE DEVICE PARTITIONS

(75) Inventors: Golden E. Murray, Mapleton; David I. Marsh; Robert S. Raymond, both of Orem; Troy Millett, Lindon, all of UT (US); Damon Janis, Katy, TX (US); Russell J. Marsh, Lindon; Paul E. Madden, Orem, both of UT (US)

(73) Assignee: PowerQuest Corporation, Orem, UT (US)

(*) Notice: Subject to any disclaimer, the term of this patent is extended or adjusted under 35 U.S.C. 154(b) by 0 days.

(21) Appl. No.: 09/302,748

(22) Filed: Apr. 30, 1999

Related U.S. Application Data

(60) Provisional application No. 60/083,982, filed on May 1, 1998, and provisional application No. 60/090,213, filed on Jun. 22, 1998.

(51) Int. Cl.[7] ........................................ G06F 12/00
(52) U.S. Cl. ........................... 711/173; 711/6; 711/112
(58) Field of Search .............................. 711/173, 129, 711/203, 209, 6, 111, 112

(56) References Cited

U.S. PATENT DOCUMENTS

| | | | |
|---|---|---|---|
| 4,677,546 | * 6/1987 | Freeman et al. | 711/203 |
| 5,282,274 | * 1/1994 | Liu | 711/206 |
| 5,546,557 | 8/1996 | Allen et al. | |
| 5,574,878 | * 11/1996 | Onodera et al. | 711/207 |
| 5,592,669 | * 1/1997 | Robinson et al. | 707/206 |
| 5,638,521 | 6/1997 | Buchala et al. | |
| 5,659,614 | 8/1997 | Bailey, III | |
| 5,675,769 | 10/1997 | Ruff et al. | |
| 5,680,303 | 10/1997 | Libucha et al. | |
| 5,706,472 | 1/1998 | Ruff et al. | |
| 5,721,858 | * 2/1998 | White et al. | 711/203 |
| 5,758,165 | 5/1998 | Shuff | |
| 5,842,226 | * 11/1998 | Barton et al. | 711/203 |
| 5,887,164 | 3/1999 | Gupta | |
| 5,907,672 | 5/1999 | Matze et al. | |

OTHER PUBLICATIONS

"Verlustlos", 1995, p. 1.
Japanese Patent Abstract, publication No. 04137126, published Dec. 5, 1992, p. 1.
Database, deja.com, 1999, pp. 1–2.
Dictionary of Computer Terms Third Edition, Barron's Educational Series, Inc., 1992, Cover Sheet, Frontispiece, pp. 280, 281, 305, 350.
Employment, deja.com, 1999, p. 1–2.
How it works (Overview), Ingenieurbuero Hoyer, 1997–1999, p. 1.

(List continued on next page.)

*Primary Examiner*—Matthew Kim
*Assistant Examiner*—Matthew Anderson
(74) *Attorney, Agent, or Firm*—Computer Law[++]

(57) ABSTRACT

The present invention provides tools and techniques for manipulating virtual partitions in a virtual engine environment without necessarily committing each partition manipulation by actually modifying on-disk system structures. A virtual engine, virtual partitions, virtual drives, and other structures in the virtual engine environment permit users to experiment with different partition manipulations in a safe and efficient manner. A batch manager manages a resulting list of partition manipulation operations, which may be optimized. The batch list may also be executed automatically by a conventional partition manipulation engine without requiring additional user input at the end of each list entry. The present invention also provides the ability to manipulate extended partitions automatically and provides support for remote partition manipulation through a two-part user interface architecture.

106 Claims, 5 Drawing Sheets

OTHER PUBLICATIONS

Simulation, webopedia.internet.com, no later than May 18, 1999, p. 1.

Taking the frazzle out of defrag, PC Week Labs, Nov. 5, 1997, pp. 1–4.

File–System Development with Stackable Layers, ACM Transactions on Computer Systems, vol. 12, No. 1, Feb. 1994, pp. 58–89.

The Generic File System, USENIX Conference, Summer 1986, pp. 260–269.

Go Anywhere and Do Anything with 32–bit Virtual Device Drivers for Windows™, Microsoft Systems Journal, Oct. 1992, pp. 1–11.

The Logical Disk: A New Approach to Improving File Systems, $14^{th}$ ACM Symposium on Operating Systems Principles, 1993, pp. 15–28.

Semantic File Systems, $13^{th}$ ACM Symposium on Operating Systems Principles, 1991, pp. 16–25.

Vnodes: An Architecture for Multiple File System Type in Sun UNIX, USENIX Conference, Summer 1986, pp. 238–247.

PCT Written Opinion.

Press release dated Jan. 12, 1997.

Press release dated Mar. 3, 1998.

* cited by examiner

MANIPULATION OF VIRTUAL AND LIVE COMPUTER STORAGE DEVICE PARTITIONS

RELATED APPLICATIONS

This application builds on and incorporates by reference the disclosure in commonly owned copending provisional patent application Ser. No. 60/083,982, filed May 1, 1998 ("the '982 application"). This application also builds on and incorporates by reference the disclosure in commonly owned copending provisional patent application Ser. No. 60/090,213, filed Jun. 22, 1998 ("the '213 application").

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. §1.14.

FIELD OF THE INVENTION

The present invention relates to manipulation of actual and simulated computer storage device partitions, and more particularly to uses of simulation to help experiment with, undo, and optimize manipulations of computer disk partitions that contain user data.

TECHNICAL BACKGROUND OF THE INVENTION

Computer hard disks and other computer storage devices hold digital data which represents numbers, names, dates, texts, pictures, sounds, and other information used by businesses, individuals, government agencies, and others. To help organize the data, and for technical reasons, many computers divide the data into drives, partitions, directories, and files. The terms "file" and "directory" are familiar to most computer users, and most people agree on their meaning even though the details of written definitions vary.

However, the term "partition" is unfamiliar to many people, and the term "drive" has different meanings even when the context is limited to computers. As used here, a "partition" is a region on one or more storage devices which is (or can be) formatted to contain one or more files or directories. So-called "IBM-compatible partition" types include extended, logical, and primary, as indicated by bitflags or other values. More generally, each formatted partition is tailored to a particular type of file system, such as the Macintosh file system, SunOS file system, Windows NT File System ("NTFS"), NetWare file system, or one of the MS-DOS/FAT file systems (MACINTOSH is a mark of Apple Computer, Inc.; SUNOS is a mark of Sun Microsystems, Inc.; WINDOWS NT and MS-DOS are marks of Microsoft Corporation; NETWARE is a mark of Novell, Inc.). A file system need not fill the partition which holds it.

"Drive" is sometimes used interchangeably with "partition," especially in references to logical drive C: or the like on so-called Wintel or IBM-compatible machines. But "drive" may also refer to a single physical storage device such as a magnetic hard disk or a CD-ROM drive. To reduce confusion, "drive" will normally be used here to refer only to storage devices, not to partitions. Thus, it is accurate to note that a partition often resides on a single drive but may also span drives, and a drive may hold one or more partitions.

It is often useful to manipulate partitions by creating them, deleting them, moving them, copying them, changing their size, changing the cluster size used by their file systems, and performing other operations. A number of tools for manipulating partitions are commercially available, including the FDISK program and the PartitionMagic® program (PARTITIONMAGIC is a registered trademark of PowerQuest Corporation). Version 4.0 of the PartitionMagic® program, which became publicly available during September 1998, implements aspects of the present invention. Partition manipulation is also discussed in detail in U.S. Pat. Nos. 5,675,769 and 5,706,472 (hereafter the '769 and '472 patents, respectively) and in commonly owned U.S. Pat. Nos. 6,108,759 filed Sep. 17, 1997, U.S. Pat. No. 5,930,831 filed Apr. 11, 1997, U.S. Pat. No. 6,250,300 filed Aug. 15, 1998, and U.S. Pat. No. 6,108,697 filed Oct. 2, 1998, each of whose respective discussions of partition manipulation tools and techniques are incorporated herein.

A Windows NT Disk Administrator program allows the user to delete or create partitions essentially in a virtual fashion, but its support for multiple "virtual" commands is limited. The user is allowed to create a partition, but must "commit changes" before that partition can be formatted. Formatting a partition can only be performed immediately. Other programs that manipulate partitions include version 3.0 of the PartitionMagic program, one or more versions of a Quarterdeck Partition-It program, and one or more versions of two programs from V Communications sold under the names System Commander Deluxe and Partition Commander. Each of these programs generally force the user to make one partition manipulation at a time.

FIG. 1 illustrates familiar approaches to partition manipulation. A user 100 supplies commands to a utility 102 such as FDISK, or an early (version 3.0 or earlier) PartitionMagic program, or another known partition manipulation tool. The user 100 also receives information from the utility 102, such as partition type(s), location(s), and size(es), and the size and location of free space region(s). This information is typically provided through a Graphical User Interface ("GUI"); one suitable GUI is illustrated in FIG. 6 of U.S. Pat. No. 5,675,769, and that Figure and its accompanying text are incorporated herein. With continued reference to FIG. 1, the utility 102 reads and (with proper semantic and syntactic constraints familiar in the art) writes a partition table 104 stored on a computer storage medium 106. The storage medium 106 may include one or more hard drives, for instance. The partition table 104 defines the position, size, and type of one or more partitions 108, which also reside on the storage medium 106, and may thus define one or more free space regions 110 as well. The utility 102 also reads and writes (again, with proper constraints) file system information and user data which are stored in the partition(s) 108 being manipulated.

Although the PartitionMagic program and other recently developed tools 102 make partition 108 manipulation easier, faster, and safer than it was with FDISK, there is still room for improvement. For instance, it would be helpful to make experimentation easier so that users 100 can more readily try different manipulations and select the ones they deem best. Implicit in this is the need to make it easier to undo a partition 108 manipulation if the user 100 does not like the results. Programs 102 could also provide more help in identifying the partition 108 manipulations that will improve the performance or storage capability of media 106 for a given computer.

One way to encourage experimentation is to make partition 108 moving and copying operations even faster than before. This may be done, for instance, by only moving user data that needs to be moved, as described in claim 1 of the '769 patent identified above. However, this general approach is bounded by limits on the speed with which storage devices 106 can move the user's data. A fundamentally different approach is needed for additional manipulation speed improvements.

Another way to encourage experimentation (at least in theory) is to give users 100 a computer program development environment, to give them computer code for a program 102 implementing the manipulations, and to teach them enough about partitions 108, partition tables 104, file systems in partitions, computers, programming, and the code to let them try different approaches. A knowledgeable programmer can "comment out" or jump around sections of program 102 code that would otherwise execute disk 106 I/O or other operations in a given situation and then update the program's data structures using a debugger or other means to imitate the omitted operation's results before the program 102 continues execution. In this way the effect of different operations on the program 102 can be explored without necessarily performing the operations.

However, this approach has several serious drawbacks, not least of which is the demand that users 100 manage a large body of complex technical knowledge. Most users 100 do not have the technical tools required for this approach. Moreover, users 100 want a reliable tool developed by skilled programmers so that the tool, not the user, manages the underlying technical details. The fact that a highly knowledgeable programmer can achieve a certain result by making technical modifications to a program 102 does not enable most users 100 (or even most programmers) to obtain that result. This is particularly true if the program modifications needed also cripple the program 102 for its normal intended use.

In short, improvements are needed to promote experimentation and otherwise advance the art of partition manipulation. Accordingly, new systems, devices, signals, and methods for manipulating partitions are disclosed and claimed below.

BRIEF SUMMARY OF THE INVENTION

The present invention provides tools and techniques for simulating and performing partition manipulations. By using the inventive simulator, users can experiment with "what if" scenarios, then "batch" all their different steps together. Prior to the invention, partitioning was a step-by-step process since each change to the disk needed to be applied before additional changes could be made. The invention speeds up the partitioning process, allowing users to manipulate the partitions to determine the desired partition structure before actually applying the changes. Users can now store multiple commands and execute them in a single batch. This encourages users to experiment by making the results of virtual manipulations rapidly available to users. Batching also allows partition manipulation by way of lengthy operations on the actual disk without requiring that a user be present to monitor the operations or input the next command.

One aspect of the invention is a virtual engine environment which allows simulation of partition manipulations to determine their effects before actually performing them. The virtual engine environment includes objects which represent the hard disk structures in such a way that they can be manipulated in multiple operations, and they retain the information necessary to perform calculations to determine the limits of the actual partitions. The virtual engine is also supported by a batch manager which stores and otherwise manages the commands generated by the virtual engine representing the operations to be performed on physical device(s).

The virtual engine has the capability to model multiple operations on the same or any number of partitions on the hard disk. The virtual engine environment can be initialized from the on-disk structures. Operations that the user may perform virtually include moving, resizing, creating, deleting, changing FAT properties (cluster size, root directory entries), converting the partition from FAT to FAT32, NTFS, HPFS, or from FAT32 to FAT, setting the partition active, hiding/unhiding the partition, formatting, and retesting for bad sectors. With one embodiment of the invention, users can: virtually manipulate partition structures for each of the disks in a computer without changing the on-disk state; generate a list of commands to perform all operations requested by the user without further user intervention; retain physical attributes of the virtual partitions including total files and directories, cluster size, used space, free space, wasted space, and file system parameters through multiple virtual operations; and undo operations before committing the changes.

One embodiment of the invention helps eliminate unnecessary reboots and also eliminates the need to reboot after each partition manipulation. One embodiment provides automatic handling of extended partitions, as it is able to make a primary partition from free space residing inside the extended partition, or make a logical partition out of free space residing outside the extended partition. In addition, the invention lets users make a drive read-only so that no changes may be made to the partitions on that drive. The invention also lets users generate a list of user-modifiable commands from a list of virtual operations, and vice-versa.

Wizards are available through the invention to help users optimize free space on a drive and within partitions by reducing cluster sizes and/or converting to more efficient file systems, and to optimize move and resize operations to perform the minimal amount of data moving necessary. A graphical or other user interface shows the before and after state of the disk before the user commits the changes proposed by the wizard. The wizard can also determine the optimal partition size based on a selected operating system, or let the user adjust the optimal size.

Some wizard embodiments automatically add partitions to a boot manager, create the partition, and move other partitions to make room for the new partition. Some embodiments automatically reduce cluster size or convert the partition to a new file system to reclaim wasted space. More generally, wizards analyze the user's disk configuration and recommend ways to use the disk more effectively. The user may also set partition constraints, such as constraints on whether a given partition can be moved or resized, and may set a minimum size to which the partition can be resized. This places constraints on the algorithm that determines changes to the partitions when creating a new partition, rebalancing free space, or reclaiming wasted space, and preparing for a new operating system. The invention adjusts logical partitions and/or primary partitions to make room for a new operating system partition, and shrinks existing partitions just enough to make room for new partitions created with the wizard. The invention also creates a primary or a logical partition based on the context of the wizard operation.

A batch manager optionally optimizes the list of partition manipulation commands by eliminating redundant operations (partition moves, creations, deletions, and so on). The batch manager keeps a persistent (on disk) list of commands representing virtual operations. It also checks the consistency of the partition before performing any changes, and optimizes out unnecessary checks between commands. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
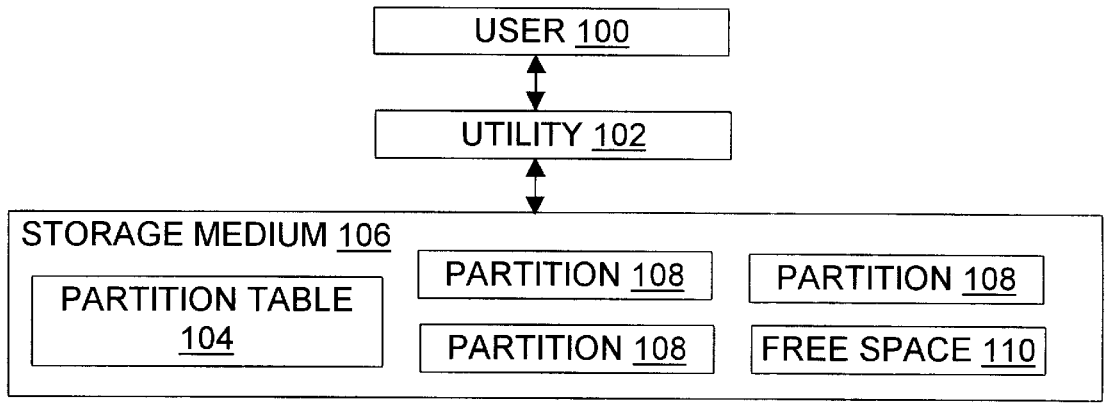
FIG. 1 is a diagram illustrating a conventional approach to partition manipulation.

The present invention relates to computer systems, methods, signals, and configured storage media for manipulating partitions. In particular, the invention provides tools and techniques which allow users to simulate partition manipulations in a virtual engine environment and, once the desired commands are identified, to apply the manipulations to live partitions on disk. The virtual engine environment gives users the freedom to experiment with different partition manipulations without requiring the overhead (incurred by unnecessary actual manipulations) of prior approaches and without requiring lay users to become experts in the underlying technology.

Some Definitions

For convenience, some of the terms used in this document are defined here. However, these definitions must be viewed in the context of the entire document, and other terms are defined by examples given throughout the document.

The word "user" is sometimes limited in technical literature or other discussions to human users of a computer system. However, in this document "user" includes human users and/or computer processes acting on behalf of human users.

"Memory" is occasionally used in the industry to refer to both internal memory and to long-term storage. In this document, memory refers to the internal memory which is typically used to hold program code and data while the program is running. Related but different items include "drives", which were explained in the Technical Background, and "storage devices", which provide longer-term storage used to hold programs, user data, and system data regardless of whether they are being used in a currently-running program. Memory is typically RAM (Random Access Memory), while familiar storage devices include magnetic disks and optical storage media. Memory is often volatile where storage devices are not, but memory can include non-volatile media such as ROM (Read-Only Memory), battery-backed RAM, and flash memory.

The words "command" and "operation" are sometimes used as synonyms in the industry, but in this document "commands" are actions at the user interface level, while "operations" are finer-grained and generally used internally in a manner which is not necessarily visible (or of direct interest) to users. One command may correspond to several operations, as when an "install a Windows NT operating system" command corresponds to a move or resize operation, a create operation, a format operation, and so on. In some cases, a command and an operation can be in one-to-one correspondence, as with a command to delete a specific file.

"Simulation" of a partition 108 or a drive providing a storage medium 106 occurs in a computer. Simulation requires a model, such as a virtual partition or a virtual drive, of the live partition 108 or live drive which is being simulated. A mere list of commands or operations alone is not a simulation. Nor is it a simulation if one modifies a program 102 (with or without access to the source code) that was written to do live partition manipulations, temporarily disables disk I/O, and imitates the results of that I/O by inserting numbers (e.g., with a debugger) before allowing execution to continue. This differs from simulation in that it (a) disables the live partition manipulation capability which is presumably the program's main purpose, and (b) is not available to ordinary users 100 because they lack one or more of the source code, debugger, knowledge of the program 102, and knowledge of the technical details of partitions 108 and partition tables 104.

"Replication" includes copying or moving a partition 108. "Renaming" includes changing a drive letter or changing a volume label. "Hidden status" of a partition 108 specifies whether the partition is hidden. "Active status" of a partition specifies whether the partition is active. Only one partition on any given physical storage device may be active at a time; the active partition is the bootable partition from which the operating system is initialized. Replication, cluster resizing, and file system type conversion assume the partition has been formatted; all other operations do not assume previous formatting.

Architectural Overview

One technological predecessor of the present invention is the PartitionMagic® 3.0 partition manipulation program, which is commercially available from PowerQuest Corporation of Orem, Utah ("PM 3.0"). Like many other partition manipulation tools 102, PM 3.0 may be viewed as having two parts, namely, a user interface and an engine, with the user interface residing on top of (i.e., closer to the user 100 than) the engine.

Figure 2:
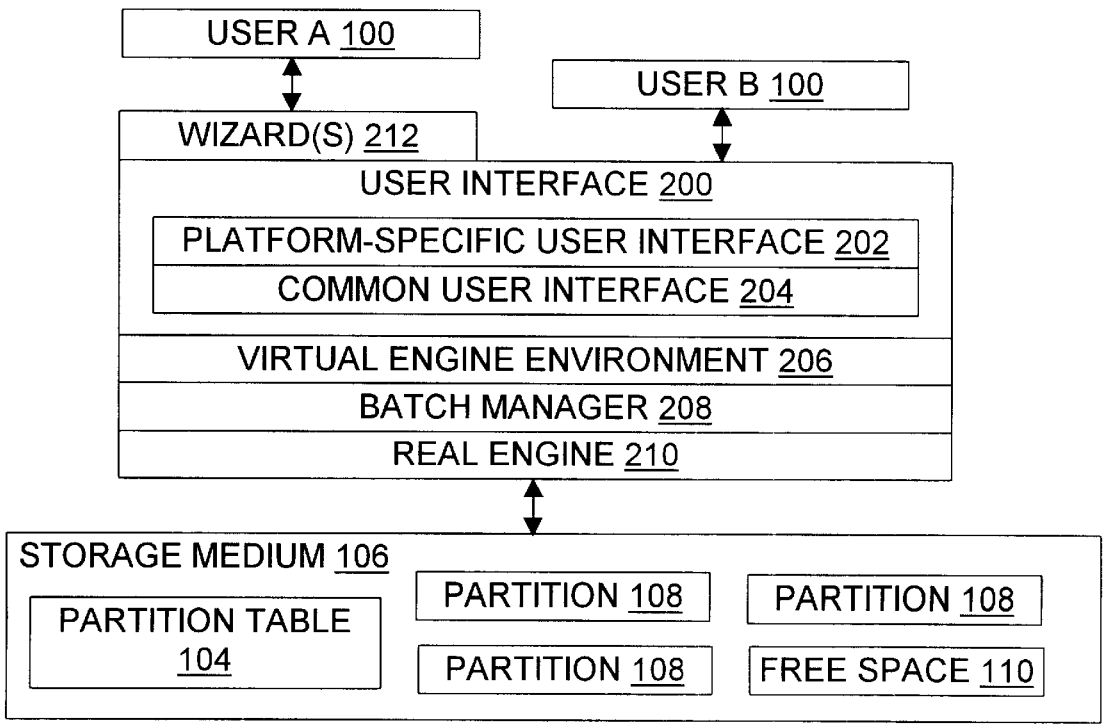
FIG. 2 is a diagram illustrating tools and techniques for partition manipulation according to the present invention, including a virtual engine environment, a batch manager, a "real engine" for performing partition manipulations, and other elements.

By contrast, as shown in FIG. 2 one embodiment of the present invention includes a user interface 200 (containing a platform-specific user interface 202 and a common user interface 204 discussed below), a virtual engine environment 206 (denoted generally as the "Virtual Engine" in the '982 and '213 applications), a batch manager 208, a "real engine" 210, and one or more wizards 212. These components, and their corresponding methods and signals, are discussed in greater detail below.

Virtual Engine Environment

The virtual engine environment 206 allows users 100 to simulate the effects of partition 108 manipulations without necessarily committing themselves by actually performing the manipulations on the disk 106. Once a desired sequence of commands is identified by the user 100, the batch manager 208 creates a corresponding sequence of operations and feeds them to the real engine 210, which actually performs the manipulations on the storage medium 106. Thus, users 100 can investigate the likely results of different command sequences without waiting for each command sequence to actually be carried out on disk. Moreover, technical details are managed by the virtual engine environment 206, the batch manager 208, and the real engine 210, so users 100 need not be technical experts in order to manipulate partitions 108 safely and efficiently.

The virtual engine environment 206 includes a virtual engine 400 and supporting structures such as virtual disk drives 402 and virtual partitions 404. The virtual engine 400 operates on virtual structures to simulate the effects of corresponding operations by the real engine 210 on the real storage medium 106 and its contents, including the real partition table 104 and the real partitions 108. Real on-disk structures are also referred to herein as "live" structures, e.g., live partitions 108. The virtual engine environment 206 is discussed further in connection with FIG. 4 and elsewhere herein.

User Interface

The platform-specific user interface ("PSUI") 202 and the common user interface ("CUI") 204 modules may be implemented such that the PSUI 202 is local on each client in a network, the CUI 204 is on a server, and the clients and server communicate over a communication link. This allows one live engine 210 and/or one live engine 210—virtual engine 400 pair to serve multiple clients even when each client uses a different platform. For instance, one client might be a diskless node running LINUX, while another is a workstation with a local disk which is running a Windows brand operating system. Interface modules, such as Java machines and/or computer networking modules (software and hardware) may be added to connect the PSUIs 202 and the CUI 204. Note that diskless nodes have no local disks, and hence no live local partitions, but can nonetheless be used as simulation platforms to perform virtual partition manipulations.

The platform-specific user interface 202 is tailored to Windows NT, Windows 95, Windows 98, Windows 2000, DOS TTY, Linux, or other text-oriented or graphical user interface environments (WINDOWS NT, WINDOWS 95, and WINDOWS 98 are marks of Microsoft Corporation). The common user interface 204 contains user interface structures and functions common to two or more platforms. In alternative embodiments, the common user interface 204 is omitted, so that only a version of the platform-specific interface 202 is present. User interfaces in general are well-known in the art, but some of the functionality presented through the user interface 200 is specific to the present invention, such as the ability to interface with a virtual engine environment 206 and the ability to commit virtual engine operations by passing them to a real engine 210 for execution.

The CUI layer 204 may be implemented as a higher level application program interface ("API") to the virtual engine 400. The CUI 204 makes usage of the virtual engine 400 easier for multiple interfaces (text/tty, GUI, scripting, . . . ) and provides remotability benefits as well. In one embodiment, the CUI layer 204 includes a set of classes, each of which pertains to a specific operation such as Delete Partition, Create Partition, and so on. These classes encapsulate almost all the functionality required by an interface but not provided by the partition manipulation portions of the virtual engine environment 206. For example, when deleting a partition, the interface 200 displays the current label and has the user 100 confirm the partition deletion by entering the label and verifying that it is correct. The CUI 204 class for the delete operation provides an API to get the label and handles the label verification before calling on the virtual engine 400 to delete the partition. The CUI layer 204 also provides APIs that are more in the user's context than the engine's, such as getting size information on a partition in Megabytes rather than a number of sectors.

One of the key design rules of the CUI layer 204 is that it shields the users 100 from the underlying structures and complexity of the virtual engine environment 206. For instance, pointers to environment 206 structures are rarely used in the CUI layer 204 API. In general, only the most basic types are used (int, double, char, and so on). This is particularly important and useful when remoting the interface.

For instance, consider the task of getting the partition 404 label. In order to accomplish this the virtual engine 400 first needs a pointer to a partition 404 or volume structure; this might be obtained through a drive object 402 pointer which is obtained from the environment 206. The system might then call a GetLabel function on the FileSystem object 408 of the partition 404: vol->GetFileSystem( )->GetLabel( ). The CUI 204 Classes encapsulate selection of a specific partition and present a GetLabel( ) function. The user 100 does not need any knowledge of a file system object, or even a volume/partition object. Volumes or partitions are selected using an integer index value. This encapsulation also allows the platform-specific user interface portion 202 of the code to be much smaller, since all common functionality used by the different interfaces resides in one place.

Another advantage of using basic types is the ease of using the interface 200 remotely. With the CUI 204 classes, it becomes very easy to put a COM (Microsoft's Component Object Model) interface over the CUI 204 without worrying about marshaling issues (one can use the IDispatch interface). The platform-specific user interface 202 can then reside on the same machine, or a different machine using DCOM (Distributed COM). It is also easier to remote when working with languages other than C++ because it is easier to write wrappers around the CUI 204 (and thus the virtual engine 400) for languages like Java.

Wizards

A wizard 212 is basically a tool that asks questions and provides a list of common answers from which the user 100 can select. The chosen answers are then used to automate the asked-for function.

A novice user such as user A in FIG. 2 may be guided through common partition manipulations by one or more wizard utilities or tutorials. More experienced users, such as user B, may bypass the wizards 212 and access the user interface 200 directly. Wizards and tutorials generally are well-known in the art, but are novel in the context of the present invention.

Batch Manager

The virtual engine 400 is supported by the batch manager 208, which stores the commands generated by the virtual engine 400. These commands represent the operations to be performed on the physical device(s) 106. In some embodiments, the batch manager 208 can optimize the stored command lists to reduce the time or effort that would be required by the real engine 210 to execute the command list. Before allowing the real engine 210 to execute a command list, the batch manager 208 also ensures that the real disk 106 is in the same state as it was when the command list was created in the virtual engine environment 206, so that user data is not damaged or destroyed (unless the user requested file deletion, for instance).

During efforts that eventually led to the present invention, an attempt was made to support "batching" or a list of multiple commands to be executed in a real engine without a distinct virtual engine environment 206. However, modifying the real engine in an ad hoc manner to implement batching inside it caused confusion arising from multiple code paths and other problems. By contrast, the virtual representation 400 of the real engine 210 can be used independently of the actual operations and real engine structures on the physical disk 106 and provides the other advantages discussed herein.

Real Engine

The real engine 210 carries out partition 108 manipulations on the storage medium 106. The real engine 210 may be a novel engine. For instance, the real engine 210 might be tightly integrated with the virtual engine environment 206 and/or the batch manager 208. The real engine 210 could also be novel in the sense that it implements features claimed in one or more commonly owned copending patent applications identified above. However, the real engine 210 may also be a conventional utility 102, perhaps with minor modifications to accept commands from the batch manager 208 in addition to (or instead of) accepting them directly from users 100. For instance, the PM 3.0 engine is an example of a real engine 210 which performs partition 108 manipulations on the hard disk or other storage device 106.

Computers and Networks Generally

Figure 3:
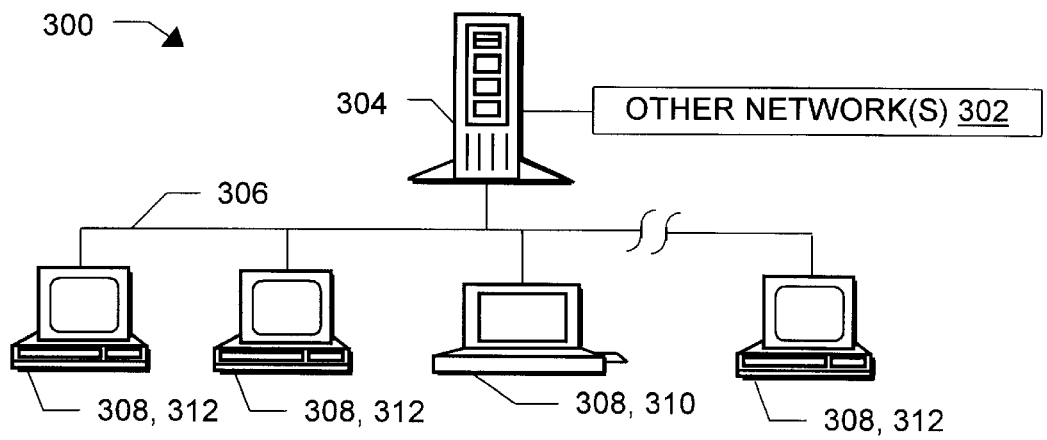
FIG. 3 is a diagram illustrating one of many possible computer networks suitable for use in remote partition manipulations according to the present invention.

FIG. 3 illustrates a network 300 which is one of the many possible networks suitable for adaptation and use according to the present invention. The network 300 may be connectable to other networks 302, including LANs or WANs or portions of the Internet or an intranet, through a gateway or similar mechanism, thereby forming a larger network which is also suitable for use according to the invention.

The illustrated network 300 includes a server 304 connected by communication links or network signal lines 306 to one or more network clients 308. Other suitable networks include multi-server networks and peer-to-peer networks. The server(s) 304 and client(s) 308 in a particular network according to the invention may be uniprocessor, multiprocessor, or clustered processor machines. The server (s) 304 and client(s) 308 each include an addressable storage medium such as random access memory.

Suitable network clients 308 include, without limitation, personal computers; laptops 310, personal digital assistants, and other mobile devices; and workstations 312. The signal lines 306 may include twisted pair, coaxial, or optical fiber cables, telephone lines, satellites, microwave relays, modulated AC power lines, RF connections, a network link, a dial-up link, a portable link such as an infrared link, and/or other data transmission "wires" or communication links known to those of skill in the art. The links 306 may embody conventional or novel signals, and in particular, may embody a novel series of commands and/or data structures in a virtual engine environment 206 as discussed herein.

The server(s) 304 and/or client(s) 308 may include a non-volatile program storage medium such as a magnetic or optical disk, ROM, bubble or flash memory. The program storage medium may be part of the same storage medium 106 that holds partition structures 104, 108, or it may be a separate medium. That is, a computer program according to the invention may be run from the storage medium 106 that the program manipulates, or the program may be run from one medium and manipulate partitions 108 on another medium, or both. A suitable program storage medium includes a magnetic, optical, or other computer-readable storage device having a specific physical configuration. Suitable storage devices include floppy disks, hard disks, tape, CD-ROMs, PROMs, random access memory, ROM, flash memory, and other computer system storage devices, configured according to the present invention.

The physical configuration represents data and/or instructions which cause the computer system 300 to operate in a specific and predefined manner as described herein. Thus, the program storage medium tangibly embodies a program, data, functions, and/or instructions that are executable by servers and/or other computers to provide and/or use a virtual engine environment 206 substantially as described herein. Suitable software and hardware implementations according to the invention are readily provided by those of skill in the art using the teachings presented here and programming languages and tools such as Java, Pascal, C++, C, assembly, firmware, microcode, PROMS, and/or other languages, circuits, or tools. On issuance of a patent based on this document, the public may also view source code examples directly in this document and in the incorporated '213 application.

When multiple computers in the system 300 are used, the common user interface 204 provides optional but generally positive benefits. For instance, commands may be sent from a first computer, e.g., the server 304, over a link 306 to an engine on a remote second computer, e.g., one or more of the clients 308. The server 304 and the client 308 may provide different platforms, e.g., Linux on the server 304 and Windows 95 on the client 308, with at least a corresponding platform-specific user interface 202 on the server 304 and at least an instance of the common user interface 204 on the client 308. In one configuration, the virtual engine environment 206 being used resides on the server 304 and the real engine 210 which eventually may carry out commands from the server 304 resides on the client 308 whose partition(s) 108 will be manipulated. In another configuration, the platform-specific user interface 202 on the server 304 communicates over a link 306 with an instance of the common user interface 204 and hence with a virtual engine environment 206 on the client 308; the real engine 210 which eventually may carry out commands from the server 304 likewise resides on the client 308.

Virtual Engine Environment

Figure 4:
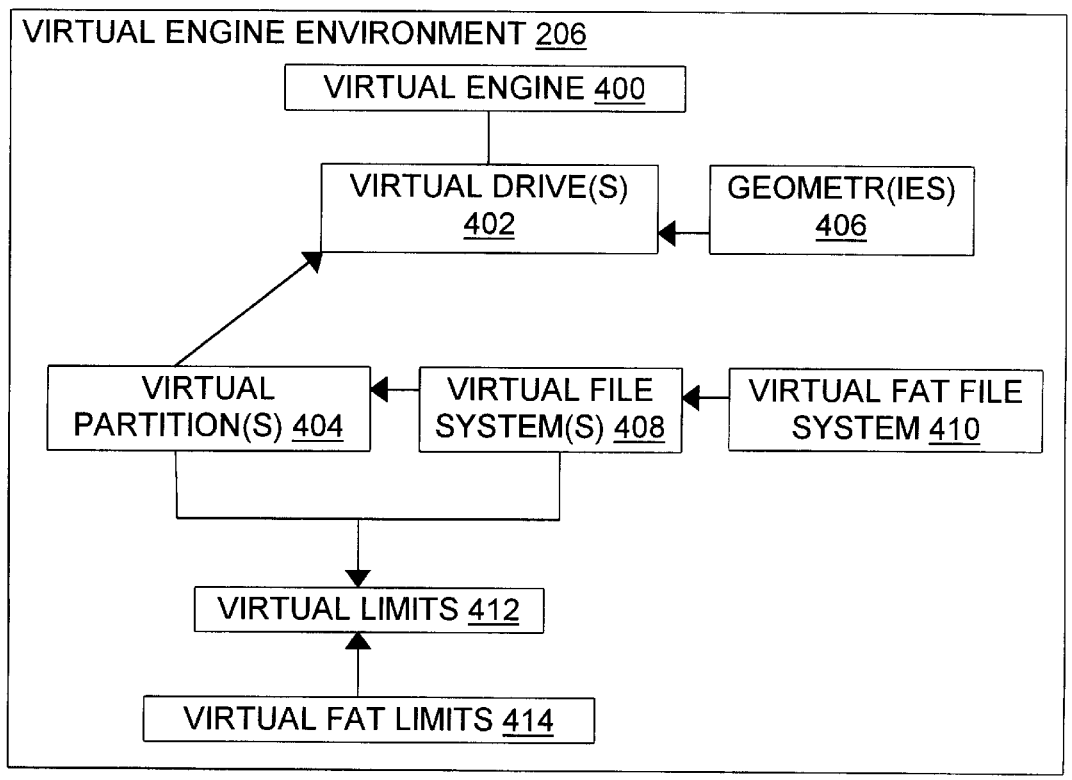
FIG. 4 is a diagram further illustrating the virtual engine environment of FIG. 2.

FIG. 4 further illustrates the virtual engine environment 206. Discussion of this Figure begins with an overview of the component functionality and structural relationships involved, and then proceeds into greater detail of the individual components.

The virtual engine environment 206 allows users to simulate the results of various partition commands without necessarily performing those commands by live partition manipulation, thereby easing and encouraging the exploration of alternative disk organizations. The virtual engine indicated at 400 is a representation of the "real" software engine 210, which can be used independently of actual operations on the physical disk or other medium 106.

As used here, "virtual partition" means a model of a partition 108, which is typically kept in memory during use. By contrast, "live partition" means the actual partition 108 on the storage device 106. Changing a virtual partition 404 does not necessarily change the corresponding live partition 108, and vice versa. The word "performing" as used here means operating on a live partition 108 on the storage device 106, as opposed to a virtual operation on a virtual partition 404.

As shown in FIG. 4, the virtual engine environment 206 include a set of objects stored in memory which represent the hard disk 106 structures in such a way that multiple operations can be simulated with the end virtual result being the "same" as if the commands were performed on the real structures. Information is kept in the virtual partition objects to enable the virtual partition 404 to be virtually moved and resized, while retaining the file system information governing total sectors used in the aggregations of files and file system structures.

The list of operations and the virtual engine environment 206 data structures may be stored as user data on the storage device 106 or another medium such as the program storage medium discussed above. The operations list and data structures may be stored either (a) indirectly when memory is paged out, or (b) directly by the inventive software to aid recovery in case of a power failure or other interruption. The discussions of recovery partition indicators and data recovery methods from the '769 and '472 patents are incorporated herein by this reference.

The simulation supported by the virtual engine environment 206 is not a mere list of commands for a computer to perform. Rather, it requires a model of the system to be simulated: in this case the model begins as an identical version of the current disk partition 108 characteristics kept in memory. Changes made to virtual partitions 404 will therefore mirror changes made to the live partitions 108 without modifying the real system on the medium 106. For example, the limits of the actual partitions 108 would be the same in the virtual system and the real system. In the rest of this section, unless otherwise stated, all changes made to the system 300 are virtual changes but corresponding physical changes may be made to partitions 108 and the partition table 104 on the storage medium 106.

The virtual engine environment 206 embodies familiar rules of partition management, such as: each logical partition must be inside an extended partition; extended partitions cannot be arbitrarily nested; non-extended partitions may not overlap; an IBM-compatible drive may have at most four primary partitions; logical partitions must be "notched"; partitions must end on a cylinder boundary; and so forth. Compliance with these rules is generally assumed by operating systems; if the rules are not followed, user data may be corrupted or lost. Of course, part of the benefit of using a virtual engine is that if you make a virtual mistake you don't also make a "real" mistake.

All changes in the virtual structures can be undone (discarded) by re-initializing the virtual structures so they once again match value-for-value the on-disk structures used by the real engine 210. In some embodiments, the virtual engine environment 206 may be bypassed (either by a local user or by remote access over a link 306), allowing direct access to the real engine 210 if the user so desires. In this case, changes cannot be so readily undone.

Using the virtual engine environment 206, multiple operations can be simulated on any number of partitions 404. Operations that the user 100 may perform virtually include the following: creating a formatted partition 404; deleting a partition 404; moving an existing partition 404; moving a newly created partition 404; copying a live partition 108 or another virtual partition 404 to a virtual partition 404; resizing an existing partition 404; resizing a newly created partition 404; changing attributes of the file system virtually, such as the FAT cluster size and the root directory entries; converting a partition 404 from one type to another, such as from FAT to FAT32, NTFS, HPFS, or from FAT32 to FAT, and so on; getting information about live partitions 108 and/or virtual partitions 404; changing the volume label on a partition 404; hiding/unhiding a partition 404; formatting; and testing or retesting for bad sectors.

An undo feature allows the user 100 to undo the virtual operations before committing to the changes to the real engine 210. Furthermore, the virtual engine environment 206 gives the user 100 the ability to automatically resize extended partitions 404 when primary or logical partitions 404 cross their boundary, or delete extended partitions 404 if a primary partition 404 is resized such that it completely covers the extended partition 404. The virtual engine environment 206 can also change the "active status" of a partition 404. Only one partition 108 on any given physical storage device may be active at a time; the active partition 108 is the bootable primary partition 108 from which the operating system is initialized.

As noted, the virtual engine environment 206 includes the virtual engine 400. The virtual engine 400 is discussed directly or by implication throughout this document; it is a major component of the virtual engine environment 206 which simulates the real engine 210.

C++ include files which define functions and structures used in an implementation of the invention (and other information as well) are included even though current law does not mandate the inclusion of source code when it exists. Those of skill will understand that corresponding *.cpp files may be readily implemented in various ways, that other implementations of the *.hpp file structures shown may also embody the invention, and that the invention may be implemented using programming languages other than (or in addition to) the C++ language. Bearing this in mind, one embodiment implements the virtual engine 400 using a C++ class such as the following, which is a condensed revision of the class described in the '213 application:

```
class VEngine
{
    public:
        VEngine ( );
        ~VEngine ( );
```

-continued

```
    PQRET Init(  ULONG Flags,        char *CmdLine,
                 int argc,            char *argv[ ],
                 UINT CodePageType,   ULONG *ulInProg,
                 // Operation in progress, (probably power failure)
                 int Debug,           BOOL Demo = FALSE);
    PQRET InitDrives ( );             PQRET UnInit( );
    VDrive *GetDrive (ULONG ordinal); BOOL BatchPending( );
    BOOL CanCommitChangesLive ( );    PQRET CommitChanges ( );
    USHORT GetNumDrives ( );   ULONG GetLargestFreespace ( );
    void SetLegalOps ( );             ULONG GetNextPartitionID( );
    BOOL AreAllPartitionsFATorFAT32 ( );
    PQRET ReadPreferences ( );   PREFERENCES *GetPreferences ( );
    virtual BOOL IsFat32Supported(BOOL *isSupported)
    // Boot Manager Functions
    BOOL BMCanSetPrefs ( ); BOOL BMCanAdd(VPartition *pPartition);
    BOOL BMCanChangeName (VPartition *pPartition);
    BOOL BMCanInstall (VPartition *pPartition);
    BOOL BMCanBeDefault (VPartition *pPartition);
    BOOL BMCanRemove (VPartition *pPartition);
    BOOL BMIsDefault (VPartition *pPartition);
    PQRET enIsBootManagerPresent ( );
    PQRET enInstallBootManager
        VPartition *pi,       // Partition to install in
        UCHAR ucPosFlag);     // Position flag
    #define BM_POS_       0
    BEGIN
    // Specifies BM to be positioned at the start of free space
    #define BM_POS_END    1
    // Specifies BM to be positioned at the end of free space
    PQRET enAddToBootManager(  // Add partition
        VPartition *pi,           // Partition to add
        char *name);              // Name of partition in menu
    PQRET enChangeBootManagerEntry(
        VPartition *pi,           // Partition to change
        char *name);              // Name of partition in menu
    PQRET enSetBootManagerDefault(
        // Set the default partition for Boot Manager
        VPartition *pi);
    PQRET enRemoveFromBootManager(
        VPartition *pi);          // Partition to be removed
    // Wizard functions
    ULONG CalcWastedSpace ( void );
    PQRET WizConvertFat32 ( void );
    // Batch manager functions
    PQBatchMgrBuild *GetBatchMgrBuild ( );
    PQBatchMgrExec *GetBatchMgrExec ( );
    BOOL GenDriveMapperCmds ( );
    // Drive Letter Calculation Functions
    BOOL CanChooseDriveLetter ( );
    void AssignDriveLetter (VPartition *NewPartition, char
DriveLetter);
    void ResetDriveLetters ( );
    void GetAvailDriveLetters(char *LetterArray, VPartition
*pDest, VLimits *pLimits);
    char GetNextDriveLetter (VPartition *pDest);
    void BuildDriveLetterList(VDriveLetterList &List, OS_TYPE
os, VLimits *pLimits)
    void RemoveDriveLetter(char Letter);
    // Partition Functions
    VPartition *GetFirstPartition ( );
    VPartition *GetNextPartition (VPartition *partition);
    // Operating System Information
    OS_TYPE GetOS ( );
    BOOL CanMountPartition(PART_TYPE partType);
    BOOL IsRebootRequired(void);
    UINT GetOrigDriveType (USHORT DriveLetterIndex)
         { return DriveTypes[DriveLetterIndex]; }
    protected:
    void LinkDriveToEnd(VDrive *pDrive);
    void LinkDriveAfter(VDrive *pDrive, VDrive *pAfter);
    VDrive *DriveList;
    PQBatchMgrBuild *BatchMgrBuild;
    // batch manager (for the "Build List" side of things)
    PQBatchMgrExec *BatchMgrExec;
    // batch manager (for the "Execute List" side of things)
    ULONG NTDriveLetterBits; // Drive letter flags from WinNT
    UINT DriveTypes[MAX_DRIVE_LETTERS];
    UCHAR CDROMFirstDrive[MAX_DRIVE_LETTERS];
    // First drive settings for CDROM drive letters
```

```
    ULONG PartitionID;
    BOOL bRebootRequired;
    // reboot will happen on exit of application
};
```

As noted above, the virtual engine environment 206 includes one or more virtual drives 402 which model actual drives holding partitions 108. The virtual drive(s) assign drive letters (e.g., "C:") according to the conventions used by the DOS and Windows operating systems. In addition, drive geometry is modeled by one drive geometry structure 406 for each virtual drive 402. As used here, "drive geometry" refers to low-level drive characteristics such as the number of cylinders, heads, and sectors per track on a physical drive which is being modeled in the virtual engine environment 206. One embodiment includes a C++ class such as the VGeometry class shown in the '213 application.

In one embodiment, virtual drives 402 are implemented using a C++ class such as the following, which is a condensed revision of the class described in the '213 application:

```
class VDrive
{
    public:
        VDrive (VEngine *engine, DISK_INFO *di); ~VDrive ( );
        PQRET Init ( ); PQRET UnInit ( );
        void SetLegalOps ( );
        // User Interface Display Information
        VPartitionDisplayInfo *GetDisplayList ( );
        USHORT GetNumUIVolumes ( );
        VPartition *GetUIVolume (USHORT Index);
        // Wizard Functions
        BOOL WizGetFreeSpace ( BOOL IsPrimary, ULONG LogicalLimit,
FS_TYPE FileSystemType, ULONG &Min, ULONG &Max, ULONG &Recommend
);
        BOOL GetFreeSpaceDisplayList( BOOL IsPrimary, ULONG
LogicalLimit, FS_TYPE FileSystemType, ULONG NewPartitionSize,
char *NewLabel, VPartitionDisplayInfo **PartList );
        PQRET WizCreatePartition ( BOOL IsPrimary, FS_TYPE
FileSystemType, ULONG NewPartitionSize, char *NewLabel );
        BOOL GetBalanceLevel ( int& );
        BOOL GetReBalanceDisplayList ( VPartitionDisplayInfo
**pFirstDisPart );
        PQRET WizReBalanceFreeSpace( void );
        ULONG CanOptimizeClusterSize ( VPartitionDisplayInfo
**PartList, ULONG &TotalWasted );
        PQRET WizOptimizeClusterSize( void );
        BOOL MainGetFreeSpace( BOOL IsPrimary, ULONG LogicalLimit,
FS_TYPE FileSystemType, ULONG NewPartitionSize, ULONG &Min, ULONG
&Max, ULONG &Recommend, VPartitionDisplayInfo **pFirstDisPart,
char *NewLabel, int FuncType );
        ULONG GetMax (VPartitionDisplayInfo *pFirstPart, ULONG
LogicalLimit, FS_TYPE fsType);
        ULONG GetRecommended (VPartitionDisplayInfo *pFirstPart,
ULONG LogicalLimit, FS_TYPE fsType);
        // Wizard Support Functions
        ULONG GetMax (VPartitionDisplayInfo *pFirstPart, ULONG
LogicalLimit);
        ULONG GetMin(VPartitionDisplayInfo *pFirstPart);
        ULONG GetRecommended (VPartitionDisplayInfo *pFirstPart,
ULONG LogicalLimit);
        // Partition Support Functions
        PQRET CreatePartition(VPartition *pDest, VLimits *pLimits);
        void AddFreeSpacePartitions (BOOL bDeleteFree = FALSE);
        PQRET Copy(VPartition *pSource, VPartition *pDest);
        PQRET DeletePartition (VPartition *pPartition);
        // Master Boot Record ("MBR") Functions
        BOOL IsMbrFull ( );
        USHORT GetNextAvailMbrOrdinal ( );
        // Partition query functions
        VPartition *GetExtended ( );
        VPartition *GetFirstPartition ( );
        // Drive Geometry Functions
        VGeometry *GetGeometry ( );          USHORT GetCylinders ( );
        USHORT GetHeads ( );                 ULONG GetSectorsPerCylinder ( );
        USHORT GetSectorsPerTrack ( );       ULONG GetBytesPerSector ( );
        ULONG GetOSSectorBoundary ( );       ULONG GetDiskSize ( );
        USHORT GetDriveNumber ( );
        // Linked List functions
```

-continued

```
    VDrive *GetPrev ( );              VDrive *GetNext ( );
    void SetNext(VDrive *pDrive); void SetPrev(VDrive *pDrive);
    // Cylinder Rounding Functions
    ULONG RoundSizeToCylinder ( ULONG ulSectsFirstCylinder, ULONG
ulNumSects, ROUND_METHOD rmRound); // ROUND_UP, ROUND_DOWN, or
ROUND_CLOSEST
    ULONG RoundPosToCylinder ( ULONG ulSectsFirstCylinder, ULONG
ulStartSect, ROUND_METHOD rmRound);
    ULONG RoundSectorToCylinder (ULONG ulSectorNumber,
ROUND_METHOD rmRound);
    ULONG Get1024CylinderBoundary ( );
    void Set1024CylinderBoundary(ULONG ulsectPast1024);
    BOOL IsReadOnly ( );
    // Parent Access
    VEngine *GetEngine ( );           DISK_INFO *GetDI ( );
    BOOL HaveDriveMappingsChanged(BOOL bGenerateCmds);
    BOOL AreAllPartsFATorFAT32 ( );
    // Linking Functions
    void UnlinkPartition (VPartition *pPartition);
    void LinkPartitionToEnd (VPartition *pPartition);
    void LinkPartitionAfter (VPartition *pPartition, VPartition
*pAfter);
    void LinkPartition(VPartition *pPartition);
    // Links the Partition in order of startsector
    protected:
    // Data members
    VEngine       *Engine;      VDrive     *Prev;
    VDrive        *Next;        VPartition *PartitionList;
    DISK_INFO     *DiskInfo;    USHORT     usDriveNumber;
    // Geometry
    VGeometry Geometry;         ULONG ulTotalSectors;
    ULONG ulOSSectorBoundary;   ULONG ul1024CylinderBoundary;
    // first sector past the 1024 cylinder boundary (FAT only)
};
```

Several copies of information about a given partition 108 may exist, including the virtual partition 404 and related structures in the virtual engine environment 206; the actual, governing structures located on the disk 106 (and possibly copied into operating system or file system memory as well), and a copy of the on-disk structures in memory for use by the real engine 210. In addition, the user interface 200 may have a set of display objects, which are a functional subset of the virtual partition 404, virtual file system and similar objects used by the virtual engine environment 206. Display objects can be used, for instance, to show the effects of rebalancing free space without invoking the fill virtual engine environment 206.

In one embodiment, virtual partitions 404 are implemented using a C++ class such as the following, which is a condensed revision of the class described in the '213 application:

```
class VPartition
{
    public:
    VPartition(  VDrive *drive,      USHORT mbrEntryOrdinal,
                 VMbrEntry *entry,   PART_CLASS PartClass,
                 BOOL isVirtual = TRUE);
    ~VPartition ( );
    PQRET Init(PARTITION_INFO *pi);    // Initializing from disk
    PQRET InitFree ( );                // Initializing Virtually
    PQRET UnInit ( );
    // Interface functions
    PQRET Adjust(VLimits *pLimits, BOOL bAddFree = TRUE);
    PQRET ChangePartition(VLimits *pLimits, BOOL HidePartition =
FALSE);
    PQRET ChangePartition(FS_TYPE fsType, void *label, UINT
labelLength, UINT uiLabelType);
    PQRET ConvertTo(FS_TYPE fsType);
    PQRET Format(FS_TYPE fsType, void *label, USHORT
labelLength, USHORT uiLabelType);
    PQRET Hide(BOOL BatchThisCommand = TRUE);   PQRET UnHide ( );
    PQRET SetActive ( );
    // Access to File System
    VFileSystem *GetFileSystem ( );
    // Limits Calculation and Initialization
    VLimits *GetLimits(BOOL bGetDetailedLimits = FALSE);
    // UI Flags Access
```

-continued

```
    ULONG GetUIFlags ( );
    // Partition State Information
    BOOL IsBootable ( );    BOOL IsExtended ( );
    BOOL IsLogical ( );     BOOL IsHidden ( );
    BOOL IsVirtual ( );     BOOL CanBeCopyDest (VPartition *pSource);
    // Partition Information
    PART_CLASS GetPartitionClass ( );
    PART_TYPE GetPartitionType ( );
    ULONG GetStartSector ( );       ULONG GetEndSector ( );
    ULONG GetSectorCount ( );       USHORT GetMbrEntryOrdinal ( );
    ULONG GetSectorsOn1stCylinder ( );
    ULONG GetNotchSectors ( );    FS_TYPE GetFSType ( );
    char *GetPartitionTypeName ( ); PARTITION_INFO *GetPI ( );
    ULONG GetPartitionID ( );
    BOOL IsTypeVisibleToOS (OS_TYPE os = OS_VER_UNKNOWN);
    void SetLegalOps ( );           void ClearBootFlag ( );
    // Functions to calculate limits around this Partition
    ULONG GetMinLeftEdgeBoundary(BOOL Recursing = FALSE);
    ULONG GetMaxRightEdgeBoundary(BOOL Recursing = FALSE);
    // Access to Parent Drive
    VDrive *GetDrive ( );
    // Linked List Functions
    VPartition *GetNext ( );        VPartition *GetPrev ( );
    void SetNext (VPartition *pPartition);
    void SetPrev(VPartition *pPartition);
    // Translation from FileSystem to VOLUME_TYPE
    VOLUME_TYPE GetVolType ( );
    // Make the Partition virtual - call this when any changes
    // are made that disallow the Partition from reading
    information from the on-disk Partition
    void MakeVirtual ( );
    // Set Functions
    void SetMbrEntryOrdinal (USHORT Ordinal);
    protected:
    BOOL IsPartKnownHidden ( );   void SetUIFlag(ULONG flag);
    void ClearUIFlag(ULONG flag);
    PQRET CreateFileSystem(FS_TYPE fsType, char driveLetter =
'*', void *label = NULL, UINT labelLen = 0, UINT labelType = 0);
    BOOL LimitsOverlap (VLimits *pLimits);
    PQRET ResizePartitionEntry (VLimits *pLimits);
    // Partition Data
    VDrive          *Drive;         PARTITION_INFO *PartInfo;
    USHORT MbrEntryOrdinal; // mbr table Index; -1 if freeSpace
    VNbrEntry       *MbrEntry;    VFileSystem  *FileSystem;
    PART_CLASS      PartClass;
    // PART_CLASS_PRIMARY,PART_CLASS_EXTENDED,PART_CLASS_LOGICAL
    ULONG   UIFlags;              BOOL   bIsVirtual;
    ULONG   ulSectorsOn1stCylinder;
    ULONG   PartitionID; // Unique to this virtual Partition
    // Linked List members
    VPartition *Prev;             VPartition *Next;
};
```

As illustrated in FIG. 4, the virtual engine environment 206 also includes a virtual file system 408 which models file systems generally, and more detailed structures such as a virtual FAT file system 410 which model partition-manipulation-related aspects of specific file systems. Other structures 410 model NTFS, HPFS, LINUX, and other file systems. The possible virtual file systems 408 include a "file system" which models an unformatted partition 108, for conveniently distinguishing free space outside partitions 108 from space that is allocated to partitions 108 but is not necessarily used (allocated to files or system structures) within the surrounding partition 108.

In one embodiment, virtual file systems 408 are implemented using a C++ class such as the following, which is a condensed revision of the class described in the '213 application:

```
class VFileSystem
{
    public:
    VFileSystem(VPartition *Partition, char driveLetter, FS_TYPE
fsType);
    virtual ~VFileSystem ( );
    virtual PQRET Init(PARTITION_INFO *i = NULL);
    // Interface Functions
    virtual PQRET Check ( );
    virtual PQRET ConvertFileSystem(VFileSystem *OldFileSystem);
```

-continued

```
    virtual ULONG GetFreeSectors ( );
    virtual ULONG GetUsedSectors ( );
    virtual PQRET RetestBadSectors ( );
    virtual char GetDriveLetter ( );
    virtual void SetDriveLetter(char letter);
    virtual PQRET SetVolumeLabel(void *label, int iBufLen, UINT
uiLabelType = CP_DOS);
    virtual PQRET Adjust (VLimits *pLimits);
    // Access to original drive letter
    char GetOldDriveLetter ( );
    PQRET Mount ( );    PQRET UnMount ( );
    // Wizard Functions
    void SetConstraints(ULONG ulFlags, ULONG ulValue);
    void GetConstraints(ULONG &ulFlags, ULONG &ulValue);
    void ClearConstraints ( );
    BOOL IsConstraintsLegal ( void );
    BOOL CanConvertFatToFat32 ( ULONG &SavedSector,
VPartitionDisplayInfo *pFirstDisPart );
    BOOL WizConvertFatToFat32 ( void );
    // Limit functions
    virtual VLimits *GetLimits(BOOL bGetDetailedLimits = FALSE);
    // UI
    void SetLegalOps ( );            virtual BOOL CanCheck ( );
    virtual BOOL CanCheckInfo ( ); virtual BOOL CanCopy ( );
    virtual BOOL CanDeFrag ( );     virtual BOOL CanFormat ( );
    virtual BOOL CanFormatAs(FS_TYPE fsType);
    virtual BOOL CanMove ( );       virtual BOOL CanResize ( );
    virtual BOOL CanResizeRoot ( );
    virtual BOOL CanRetestBadSectors ( );
    virtual BOOL CanSetLabel ( );   virtual BOOL CanConvertHPFS ( );
    virtual BOOL CanConvertTo(FS_TYPE fsType);
    virtual BOOL CanCheckNative ( );
    // File System Information
    virtual FS_TYPE GetFSType ( );
    virtual PQRET GetBadMBRError ( );
    virtual BOOL CheckFailed ( );
    virtual PQRET GetInfo(ALL_INFO *ai);
    virtual PQRET GetCheckInfo(ALL_CHECK_INFO *ci,ULONG ulPref);
    ULONG GetEstimatedFilesAndDirs ( );
    void SetEstimatedFilesAndDirs (ULONG ulFilesandDirs);
    virtual USHORT DeterminePartitionType ( );
    virtual ULONG GetSerialNumber ( );
    // File System Cloning Function - Used for Copy operation
    virtual void CopyFileSystem(VFileSystem *fsSource);
    // Volume Label Functions
    virtual PQRET GetVolLabel(void *label, int iBufLen, UINT
*uiLabelType = NULL, int *iRetBufLen = NULL);
    virtual VOL_LABEL GetVolLabel ( );
    virtual void SetVolLabel(void *label, int iBufLen, UINT
uiLabelType);
    // Access to parents
    VPartition *GetPartition ( );
    protected:
    void SetUIFlag(ULONG flag);    void ClearUIFlag(ULONG flag);
    virtual BOOL CanFatResizeRoot ( );
    ULONG GetMinFSSize(FS_TYPE fsType);
    ULONG GetMaxFSSize(FS_TYPE fsType);
    VPartition *Partition; // Parent object
    // File System Constraints
    ULONG ulConstraintFlags;
    ULONG ulConstraintValue; // Percent or number of sectors
    // File System Data
    VOL_LABEL  Label;         char       OldDriveLetter;
    char       DriveLetter;   FS_TYPE FSType;
    ULONG      ulEstFilesAndDirs;  // Estimated # of files & dirs
    ULONG      UIFlags;       ULONG   ulSerialNumber;
    ULONG      ulUsedSectors; ULONG   ulFreeSectors;
    BOOL       bCheckFailed;
};
```

In one embodiment utilizing C++ objects, a virtual limit object 412 (corresponding to a given virtual partition object 404 and matching virtual file system 408 object) is created when virtual partition 404 manipulations are begun. In conjunction with a file-system-specific limits object 414, the virtual limit object 412 encapsulates limits such as the left and right boundaries of the virtual partition 404, the size of the virtual partition 404, the requirement that the partition 404 boundary be a disk cylinder boundary, the partition 404 "class" (primary, logical, or extended; not to be confused with a C++ class), an indication whether the partition 404 is formatted, the volume label if any, which file system types are available if the partition object 404 represents unformatted space on the medium 106 and which file system type is present if the partition object 404 represents a formatted non-extended primary or formatted logical partition 108.

File system availability depends on which file systems have corresponding virtual file system definitions (e.g., definition 410 for FAT file systems) in the implementation of the virtual engine environment 206 and on the size of the virtual partition 404. For instance, some FAT partitions 108 have a maximum size of 2 Gigabytes, LINUX swap partipossible), partition class (FAT), and partition formatting status (unformatted). "FAT" refers collectively to all FAT file systems, including FAT12, FAT16, and FAT32 file systems.

Virtual limit objects 412 may be implemented using a C++ class such as the following, which is a condensed revision of the class described in the '213 application:

```
class VLimits
{
    public:
        VLimits (VPartition *Partition);          virtual ~VLimits ( );
        PQRET Init ( );                            ULONG GetMaxStartSector ( );
        ULONG GetMinStartSector ( );               ULONG GetStartSector ( );
        virtual void SetStartSector(ULONG ulSect, BOOL bResize);
        ULONG GetMaxEndSector ( );                 ULONG GetMinEndSector ( );
        ULONG GetEndSector ( );
        virtual void SetEndSector(ULONG ulSect, BOOL bResize);
        ULONG GetMaxSize ( );                      ULONG GetMinSize ( );
        ULONG GetSize ( );                         UINT64 GetSizeBytes ( );
        virtual void SetSize(ULONG ulSize);
        virtual ULONG CalcMaxSize(ULONG minStartSect, ULONG
    maxEndSect);
        virtual ULONG CalcMinSize ( );    ULONG GetUsedinExtended ( );
        FS_TYPE GetFSType ( );
        virtual PQRET SetFSType(FS_TYPE fsType);
        BOOL IsFSTypeValid(FS_TYPE fsType);
        PQIDSTR GetMessageId ( );
        // Partition Class Information
        BOOL CanCreatePrimary ( );        BOOL CanCreateLogical ( );
        void SetPartitionClass(PART_CLASS newtype);
        PART_CLASS GetPartitionClass ( );
        PART_TYPE DeterminePartitionType ( );
        BOOL IsHidden ( );
        // Drive Letter Information
        void GetAvailDriveLetters (char *LetterArray);
        void SetDriveLetter(int LetterIndex);
        int GetDriveLetterIndex ( );         char GetDriveLetter ( );
        // Set/get number of sectors before and after this Partition
        ULONG GetSectorsAfter ( );           ULONG GetSectorsBefore ( );
        void SetSectorsAfter(ULONG ulNumSects, BOOL bResize);
        void SetSectorsBefore(ULONG ulNumSects, BOOL bResize);
        // Volume Label Information
        virtual PQRET SetVolLabel(void *label, UINT uiBufLen = 0,
    UINT labelType = CP_DOS);
        void *GetVolLabel ( );               UINT GetVolLabelLength ( );
        UINT GetVolLabelType ( );            BOOL IsLabelChanged ( );
        ULONG GetResizeIncrement ( );        VPartition *GetPartition ( );
    protected:
        // Parent Partition & File System
        VPartition *Partition;               VFileSystem *FileSystem;
        // Current Size and Position
        ULONG ulNewStartSect;                ULONG ulNewSize;
        // Min/max values for StartSect, EndSect, and Size
        ULONG ulOldMinStartSect;             ULONG ulMinStartSect;
        ULONG ulMinEndSect;                  ULONG ulMinSize;
        ULONG ulMaxStartSect;                ULONG ulMaxEndSect;
        ULONG ulMaxSize;
        FS_TYPE FSType;   // Current File System Type
        ULONG ulResizeIncrement;             void *VolumeLabel;
        UINT uiLabelLength;                  UINT uiLabelType;
        BOOL bLabelChanged;
        virtual void SetMessage ( );         // Dialog Warning Message ID
        PQIDSTR MessageId;
        int DriveLetterIndex;
        // Partition Class
        PART_CLASS Partclass;                PART_CLASS OldPartClass;
};
``` tions 108 have a maximum size of 128 Megabytes, FAT32 partitions 108 must be at least 256 Megabytes in size, and so on. Definitions analogous to the FAT file system definition 410 are readily provided for NTFS, HPFS, LINUX/EXT2, FAT32, various other FAT, and other file systems. An implementation may use default values for partition size (largest One or more corresponding file-system-specific limit classes can be used to define additional limits which depend on the file system involved. For clarity of illustration, FIG. 4 shows a single instance of such a class, in the form of a virtual FAT limits object 414. As with the other components of FIG. 4, however, it will be appreciated that the filesystem-specific limits component(s) 414 need not be implemented using C++ classes, much less by using the particular classes provided herein as examples. Other programming languages and paradigms may be used, including C, Pascal, Bearing this in mind, file-system-specific virtual limit objects 414 may be implemented using a C++ class such as the following, which is a condensed revision of the class described in the '213 application:

```
class VFatLimits: public VLimits
{
public:
VFatLimits (VPartition *Partition);
BOOL IsFat16Available ( );              BOOL IsFat32Available ( );
PQRET Init (ULONG *ulFat16MinTbl, ULONG *ulFat16MaxTbl,
    ULONG *ulFat32MinTbl,           ULONG *ulFat32MaxTbl,
    ULONG *ulClustsReqTbl,          UINT64 *ulWaste,
    UINT64 *ulUsed,                 ULONG ulCurSizeL,
    ULONG ulSPC,                    ULONG ulBPS,
    ULONG ulUsedRoot,               ULONG ulRootCapacity,
    ULONG ulDataStartL,             ULONG ulReservedL);
virtual void SetStartSector(ULONG ulSect, BOOL bResize);
virtual void SetEndSector(ULONG ulSect, BOOL bResize);
virtual void SetSize(ULONG ulSize);
void SetClustSize (ULONG ulClustSize);
void SetRootCapacity(ULONG ulNewCapacity);
virtual PQRET SetFSType(FS_TYPE fsType);
void GetClustInfo(ULONG ulClustSize, ULONG *ulUsedSects,
ULONG *ulWastedSects, ULONG *ulMinSects, ULONG *ulMaxSects);
    ULONG GetClustSize ( );         ULONG GetMaxRootEntries ( );
    ULONG GetMinRootEntries ( );    ULONG GetOldClustSize ( );
    ULONG GetRecClustSize ( );      ULONG GetRootCapacity ( );
    ULONG GetRootIncrement ( );     ULONG GetUsedRootEntries ( );
    ULONG GetValidClustSizes ( );   FAT_TYPE GetFatType ( );
    ULONG GetFirstDataSect ( );
    virtual ULONG CalcMaxSize(ULONG ulMinStartSect, ULONG
ulMaxEndSect);
    virtual ULONG CalcMinSize ( );
    UINT64 *GetWasteTable ( );      UINT64 *GetUsedTable ( );
    int iGetClustIndex (ULONG ulNewClustSize);
    protected:
    void iSetClustSize (ULONG ulNewClustSize);
    void iSetSize(ULONG ulNewSize);
    void iSetFatType(FAT_TYPE newType)    { type = newType; }
    void CalcActualRoot (void);        void ValidateClusterSize ( );
    ULONG ulFat16Min [FAT_MAX_CLUST_SIZES];
    ULONG ulFat16Max [FAT_MAX_CLUST_SIZES];
    ULONG ulFat32Min [FAT_MAX_CLUST_SIZES];
    ULONG ulFat32Max [FAT_MAX_CLUST_SIZES];
    ULONG ulClustsReq [FAT_MAX_CLUST_SIZES];
    UINT64 ulwaste [FAT_MAX_3CLUST_SIZES];
    UINT64 ulUsed [FAT_MAX_CLUST_SIZES];
    // the "try for" values are used to try to give the user
    // what's asked for, not just blindly pick a value that
    // works. For example, if a cluster size is selected that
    // requires the partition to be resized, selecting the old
    // cluster size will return the size to its previous value.
    ULONG ulTryForSize;             ULONG ulOldClustSize;
    ULONG ulClustSize;              ULONG ulTryForClust;
    ULONG ulOldRootCapacity;        ULONG ulRootCapacity;
    ULONG ulTryForRoot;             FAT_TYPE oldType;
    FAT_TYPE type;                  FAT_TYPE typeTryFor;
    // other important information
    ULONG ulUsedRoot;
    ULONG ulBPS;                    // bytes per sector
    ULONG ulDataStart;              ULONG ulReservedSectors;
    // work variables
    ULONG ulCurIndex;     // index # of the current cluster size
};
``` or assembly, for instance, and less modular approaches can be used than the C++ paradigm of classes and objects.

Moreover, as with the other file-system-specific component 410 shown in FIG. 4, file systems other than FAT file systems can be used in addition to, or in place of, a particular FAT file system in a given embodiment. Suitable file systems are identified herein and also known to those of skill in the art.

One alternative to defining a virtual partition "class" to implement virtual partitions 404 is to instance three separate classes, one each for primary, logical, and extended partitions 404. However, this makes it necessary to replace partition 404 updates that would otherwise simply overwrite variables in an object with destroy-create sequences that free an object and create and initialize a replacement object, thereby slowing down execution of virtual partition 404 manipulations.

One alternative to using file-system-specific objects 410 is to encapsulate all necessary file system rules in a single global entity in the virtual engine environment 206. A potential drawback of using file-system-specific limit objects 414 is that rules governing file systems and partitions are spread throughout the program. As the user 100 brings up a dialog to create a new partition, an implementation using file-system-specific limit objects 414 must create a generic limits object 412 which must calculate values for all file systems. As the user 100 selects the file system type to be created, the implementation must recalculate and adjust for the specific partition 404 involved. Redundant calculations must also be made in the file system object 408. The alternative creates a global Rules class that contains a list of rules objects governing the parameters for each file system type. This class is used for all calculations and therefore ensures consistent calculations throughout the virtual engine environment 206 and the real engine 210. For example, the Rules list contains a FatRules object that is used to calculate minimum and maximum sizes, limits of expansion/contraction, limits to movement, and so forth for FAT partitions 108.

Within one embodiment of the virtual engine environment 206, file system type conversion involves destroying the virtual file system object 410 and replacing it with an instance of another virtual file system object for the target file system.

Batch Manager

When the user 100 is satisfied with the virtual changes shown in the virtual engine environment 206, then the batch manager 208 may be used to manipulate the live partitions 108 in a corresponding manner. The batch manager 208 keeps a persistent list of the commands being performed by the virtual engine 400. The batch manager 208 list of commands, when run by the real engine 210, will perform actual partition 108 manipulation. This list may be implemented using C++ classes such as the PQBatch* classes from the '213 application, incorporated herein. In particular, command or operation list generation may be implemented using a C++ class such as the following, which is a condensed revision of the class described in the '213 application:

```
class PQBatchMgrBuild
{
    public:
    PQBatchMgrBuild ( );
    virtual ~PQBatchMgrBuild ( );
    PQRET Init(     ULONG Flags,         char *CmdLine,
                    int argc,            char *argv[ ],
                    UINT CodePageType,   ULONG *ulInProg,
                    int Debug);
    PQRET UnInit ( );
    BOOL AddDriveMapperOpToList (PQBatchDriveMapper *dmp, BOOL
bAddToFront=FALSE);
    BOOL AddBatchOperation(PQBatchOperation *op);
    PQRET WriteBatchList (char *filename);
    void GetUniquePartitionID (VPartition *vPart,
UNIQUE_PARTITION_ID *upid);
    BOOL TestIfPartitionIsLockable (VPartition *vPart);
    // Batch methods - these perform the actual batch tasks
    void InitOp ( VPartition *vPart, UNIQUE_PARTITION_ID *upid);
    void InitOpConvert( VPartition *vPart, UNIQUE_PARTITION_ID
*upid, FS_TYPE NewFSType);
    BOOL DoCreate( VPartition *vPart, UNIQUE_PARTITION_ID
unique_ID);
    BOOL DoDelete ( VPartition *vPart, UNIQUE_PARTITION_ID
unique_ID);
    BOOL DoAdjust ( VPartition *vPart, UNIQUE_PARTITION_ID
unique_ID);
    BOOL DoFATAdjust( VPartition *vPart, UNIQUE_PARTITION_ID
unique_ID, ULONG ulclusterSize,FAT_TYPE newType,ULONG
ulrootCapacity);
    BOOL DoFormat ( VPartition *vPart, UNIQUE_PARTITION_ID
unique_ID);
    BOOL DoSetVolLabel ( VPartition *vPart, UNIQUE_PARTITION_ID
unique_ID);
    BOOL DoHide ( VPartition *vPart, UNIQUE_PARTITION_ID
unique_ID);
    BOOL DoUnHide ( VPartition *vPart, UNIQUE_PARTITION_ID
unique_ID);
    BOOL DoSetActive ( VPartition *vPart, UNIQUE_PARTITION_ID
unique_ID);
    BOOL DoBadSectorRetest( VPartition *vPart,
UNIQUE_PARTITION_ID unique_ID);
    BOOL DoCopy( VPartition *vPart, UNIQUE_PARTITION_ID
unique_ID, short destDriveId, ULONG destStartSect, ULONG
destEndSect);
    BOOL DoConvertTo (VPartition *vPart, UNIQUE_PARTITION_ID
unique_ID, FS_TYPE newFsType);
    BOOL DoDriveMapper(char oldDriveLetter, char newDriveLetter
};
    BOOL IsAnythingBatched ( );
```

```
    BOOL IsEmpty ( );
    void PurgeLists (void);
    BOOL GetDiskConfigSignature ( );
    BOOL AddDiskConfigToList(DiskConfigCheck *dc);
    // Batch command optimization methods
    PQRET OptimizeList ( );
    BOOL IsRebootNeededToExecute ( );
    protected:
    PQBatchOperation *FirstOp;      PQBatchOperation *LastOp;
    DiskConfigCheck *FirstDC;       DiskConfigCheck *LastDC;
    PQBatchDriveMapper *FirstDM;    PQBatchDriveMapper *LastDM;
    BOOL RebootNeededToExecute;
};
```

After being stored, these commands can also be retrieved and edited. For instance, one embodiment of the batch manager 208 can optimize the stored lists. This may be accomplished by eliminating redundant moves, creations, deletions, and so on. It may also be accomplished by removing unnecessary file system checks between commands.

The batch manager 208 allows actual execution of the stored list. Before beginning execution, the batch manager 208 ensures that the real disk 106 is in the same state as when the virtual engine 400 began storing the list. If the states differ, the execution ends and the error is reported; otherwise, user data could be damaged or lost. This may be implemented using a C++ class such as the DiskConfigCheck class and the BEFORE/NEW variables from the '213 application, incorporated herein. Actual execution of the listed operations may be implemented using the real engine 210 and a C++ class such as the following, which is a condensed revision of the class described in the '213 application:

```
class PQBatchMgrExec
{
    public:
    PQBatchMgrExec ( ) ;
    virtual ~PQBatchMgrExec ( ) ;
    PQRET PQBatchMgrExec::ReadBatchList (char *filename) ;
    PQRET CreateBatchObjectFromString (char *line) ;
    char * ScanForUniqueID(UNIQUE_PARTITION_ID *pUniqueID, char
*linePtr) ;
    char * ScanForULong ( char *srchStr, char *startPtr, char
*linePtr, ULONG *ulVal) ;
    char * ScanForUShort ( char *srchStr, char *startPtr, char
*linePtr, USHORT *usVal) ;
    char * ScanForUChar ( char *srchStr, char *startPtr, char
*linePtr, UCHAR *ucVal) ;
    char * ScanForString( char *srchStr, char *startPtr, char
*linePtr, ULONG maxlen, char *string) ;
    char * ScanForDelim(char *string, char *delim) ;
    PQRET ParsePMHeader (char *linePtr) ;
    PQRET ParseDriveMapperCommand (char *linePtr) ;
    PQRET ParseDiskConfigData (char *linePtr) ;
    PQRET ParseCreateCommand (char *linePtr) ;
    PQRET ParseDeleteCommand (char *linePtr) ;
    PQRET ParseAdjustCommand (char *linePtr) ;
    PQRET ParseFATAdjustCommand (char *linePtr) ;
    PQRET ParseSetVolLabelCommand (char *linePtr) ;
    PQRET ParseHideCommand (char *linePtr) ;
    PQRET ParseUnHideCommand (char *linePtr) ;
    PQRET ParseSetActiveCommand (char *linePtr) ;
    PQRET ParseCopyCommand (char *linePtr) ;
    PQRET ParseFormatCommand (char *linePtr) ;
    PQRET ParseConvertToCommand (char *linePtr) ;
    PQRET ParseBadSectRetestCommand (char *linePtr) ;
    BOOL AddBatchOperation (PQBatchOperation *op) ;
    BOOL AddDriveMapperOpToList (PQBatchDriveMapper *dm) ;
    PQRET ExecuteList ( ) ;
    short GetOperationCount ( ) ;      short GetDriveMapperOpCount ( ) ;
    BOOL IsAnythingBatched ( ) ;       BOOL IsEmpty ( ) ;
    BOOL AddDCToList (DiskConfigCheck *diskConfig) ;
    PQRET CheckDiskConfig ( ) ;
    protected:
    PQBatchOperation *FirstOp;         PQBatchOperation *LastOp;
    DiskConfigCheck *FirstDC;          DiskConfigCheck *LastDC;
    PQBatchDriveMapper *FirstDM;       PQBatchDriveMapper *LastDM;
};
```

The batch manager 208 can also determine whether a partition 108 may safely be manipulated during the present user session; some manipulations should instead be performed later in boot mode. The batch manager 208 can determine whether a reboot into an alternate execution mode controlled by the inventive software will be necessary before live execution of operations (to obtain a lock on a partition 108 which is not otherwise readily locked), and whether a reboot will be needed after live execution of operations on partition(s) 108 to update structures in operating system memory with changes newly committed to disk 106. The alternate execution mode interrupts the boot process and thus permits the inventive software to do its work before the operating system finishes loading. On a Microsoft Windows NT system, for instance, the inventive software may include an application that looks to the Windows NT operating system like a protected subsystem of that operating system, but is actually an application program running at so-called "subsystem load time".

Generally, a reboot into the alternate execution mode is needed if the invention's embodiment cannot obtain a lock on a partition 108 from the operating system. That is, boot mode provides an exclusive lock on the drive before performing operations, and allows execution of batched operations before the operating system takes control. If new drive letters are created by partition manipulations, some operating systems (such as Windows 95 and other Windows environments) require a reboot to update the operating system's view of the drive letters now being used on the disk(s) 106.

The drive mapping utility automates the update of drive references in *.ini files and registry files when drive letter changes are made by partition manipulation. In one embodiment the batch manager 208 also generates drive mapping commands. Since the sequence in which drive mappings are changed is critical, the batch manager 208 manages drive mapping sequencing for a drive mapping utility. Suitable drive mappers can be implemented using a C++ class such as the PQBatchDriveMapper class from the '213 application, incorporated herein, with drive mapping functionality familiar in the art, such as that found in the PowerQuest PartitionMagic version 3.0 DriveMapper utility.

Wizards

One embodiment of this invention provides one or more wizards 212 to help users 100 perform common actions. For example, a user 100 could ask a wizard 212 to virtually optimize free space on a given drive. The wizard would then decide without further user input how to perform the optimization. In one embodiment the wizard 212 does not provide any extra functionality, in the sense that everything the wizard 212 does can be done by the user 100 using the virtual engine environment 206 directly through the user interface 200 without the wizard 212.

However, wizards 212 provide convenient shortcuts for expert users 100 and helpful guidance to novice users 100. The functions listed below can be automated using one or more wizards 212 in conjunction with the virtual engine environment 206. As mentioned above, all the functions here are performed "virtually" but also generate a list of commands to drive real manipulations performed by the real engine 210 if so desired:

Optimize free space on a drive and within partitions by reducing cluster sizes and converting to more efficient file systems.

Optimize move and resize operations to perform the minimal amount of data moving necessary.

Show the before and after state of the disk before the user 100 commits the changes proposed by the wizard.

Determine the optimal size based on the selected operating system.

Allow the user 100 to adjust the optimal size.

Automatically add partitions to the boot manager, create the partition, and move other partitions to make room for a new partition.

Automatically reduce cluster size or convert to a new file system to reclaim wasted space.

Analyze the user's disk configuration and recommend ways to use the disk more effectively.

Allow the user 100 to set constraints on whether a given partition can be moved or resized. If the partition can be resized, determine the minimum size for the partition. This is used for placing constraints on the algorithm that determines changes to the partitions when creating a new partition, rebalancing freespace, or reclaiming wasted space, and when preparing to install a new operating system.

Adjust logical partitions and primary partitions to make room for a new operating system partition.

Shrink existing partitions just enough to make room for new partitions created with the wizard.

Create a primary or a logical partition, based on the context of the wizard operation.

Methods

Figure 5:
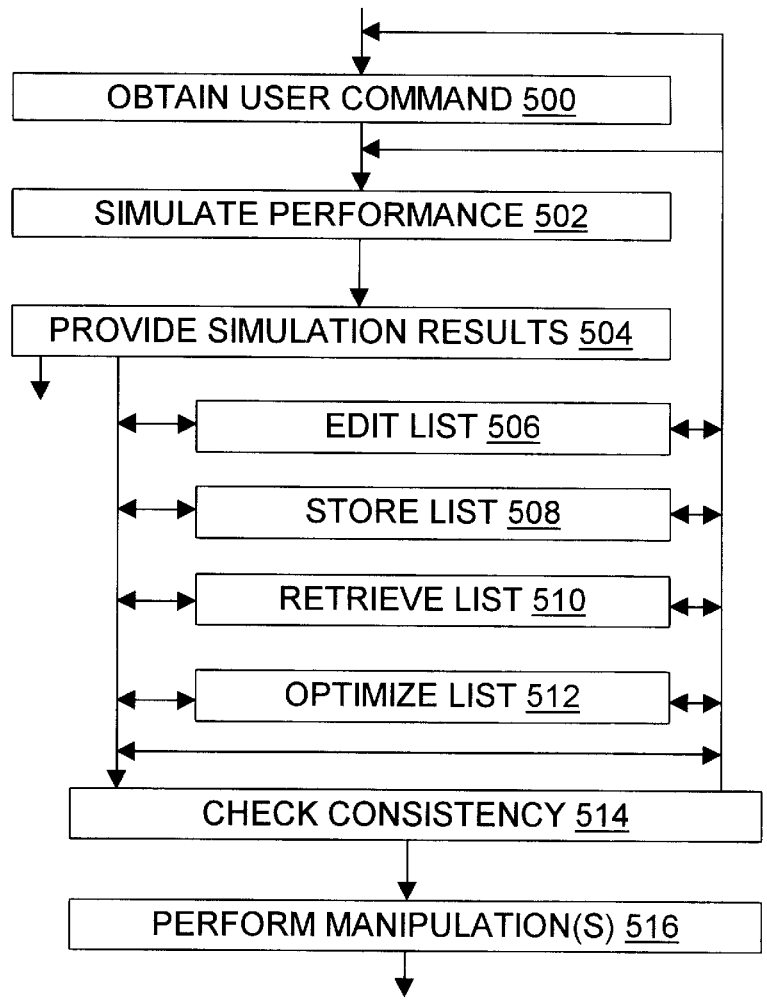
FIG. 5 is a flowchart illustrating methods of the present invention.

FIG. 5 illustrates methods of the present invention. During an obtaining step 500, an embodiment of the invention obtains one or more virtual partition 404 manipulation commands from the user 100. The embodiment may include inventive software like that shown in FIG. 2 and/or an inventive system like one or more computers shown in FIG. 3, configured with code and/or hardware to operate according to the methods described herein.

The obtaining step 500 may be accomplished in one or more of a group of ways. For instance, the embodiment may obtain the command interactively from the user 100 through a command line interface 200 or a graphical user interface 200. Or the command may be obtained from a batch file or script that is created by the user 100 and then read by the user interface 200.

Likewise, the command may be obtained locally, in the sense that the user 100 directly operates the same machine that is running the user interface 200 and the virtual engine environment 206, or the command may obtained from a remote user 100 over a communications link 306.

In the case of remote users 100, various approaches are possible. In the most separated case, the user 100 generates commands at one computer, sends them to a second computer for simulation, and performs manipulations on a storage medium 106 attached to a third computer, but variations involving fewer computers and locations are also possible.

In one approach, the computer to which the storage device 106 is attached is deemed local, and a simulating step 502 locally simulates at least one operation which may be performed 516 locally in response to the remote user's command. For instance, in response to a user's command from location R, a computer at location X runs the virtual engine to simulate manipulation of a disk 106 that is attached to the computer at location X.

In a second remote user 100 approach, the computer to which the storage device 106 is attached is again local, but the simulating step 502 remotely simulates at least one operation which may be performed 516 locally in response to the remote user's command. For instance, in response to a user's command from location R, a computer at location R simulates manipulation of a disk 106 that is attached to a computer at location X.

In a third remote user 100 approach, the computer to which the storage device 106 is attached is also remote, and the simulating step 502 locally simulates at least one operation which may be performed 516 remotely in response to the remote user's command. For instance, in response to a user's command from location R, a computer at location Y simulates manipulation of a disk 106 that is attached to the computer at location R.

In a fourth remote user 100 approach, the computer to which the storage device 106 is attached is remote, and the simulating step 502 remotely simulates at least one operation which may be performed 516 remotely in response to the remote user's command. For instance, in response to a user's command from location R, a computer at location X simulates manipulation of a disk 106 that is attached to a computer at location Y.

During the simulating step 502, the embodiment simulates partition manipulation in the virtual engine environment 206. This can be accomplished using computers, networks, computer program storage media, and/or other devices and machines configured according to the methods, structures, and/or codes described herein, in a wide variety of different combinations.

It will be appreciated from the information provided throughout this document that the simulating step may include simulated partition 404 creation (creating a simulated logical partition 404, a simulated primary partition 404, and/or a simulated extended partition 404); simulated partition 404 formatting; simulated partition 404 replication; simulated partition 404 deletion; simulated partition 404 resizing by changing the number of sectors in the simulated partition 404; simulated partition 404 resizing by changing the cluster size of the simulated partition 404; simulated partition 404 resizing by changing the size of a simulated extended partition 404 in connection with resizing a simulated logical partition 404 within that simulated extended partition 404 so that the extended partition 404 continues to properly contain the logical partition 404; simulated partition 404 resizing by expanding a simulated extended partition 404 into free space that is obtained by manipulating another simulated partition 404 outside the simulated extended partition 404; changing the root directory size of a simulated partition 404; renaming a simulated partition 404; simulated partition 404 conversion by changing the file system type of the simulated partition 404, such as conversion between FAT16 and FAT32 file system formats, and possibly thereafter displaying 504 an indication of the simulated partition's free space and/or used space after the conversion; changing the hidden status of a simulated partition 404; and/or changing the active status of a simulated partition 404.

The simulating step 502 optionally inserts a placeholder for a step 514 of verifying the integrity and consistency of live internal file system data in connection with performing 516 manipulations that were previously simulated 502. Such consistency checks 514 are generally worthwhile, but some real engines 210 will perform them regardless of whether they are expressly instructed to do so by a simulation-provided placeholder.

The simulating step 502 optionally inserts a placeholder for a step of testing for bad sectors in a live partition 108. Bad sector testing can be time-consuming but is worthwhile with some media 106 and/or in cases where a partition 108 manipulation would place data on a previously unused portion of the media 106. The discussions of bad sector tests given in the '769 and '472 patents are incorporated herein.

During a providing step 504, the embodiment provides the user 100 with the results of the simulation(s) done during step 502. This may be accomplished by displaying modified partition information on a text or graphical user interface 200, in the case of human users 100. Results may also be provided 504 by data transfer from the embodiment to a computerized or automated user 100. Special display objects may be used to facilitate this step 504; these display objects include copies of a subset of the virtual engine environment 206 objects. In one embodiment, the display objects include one or more instances of a C++ class such as the following, which is a condensed revision of the class described in the '213 application:

```
class VPartitionDisplayInfo
{
    public:
    VPartitionDisplayInfo (VPartition *Partition) ;
    VPartitionDisplayInfo ( ) ;          ULONG GetUsedSectors ( ) ;
    ULONG GetStartSector ( ) ;           ULONG GetSectorCount ( ) ;
    FS_TYPE GetFSType ( ) ;              BOOL IsLogical ( ) ;
    VFileSystem *GetFileSystem ( ) ; BOOL GetIsHidden ( ) ;
    VPartitionDisplayInfo* GetNext ( ) ;
    VPartitionDisplayInfo* GetPrev ( ) ;
    void SetFileSystem ( VFileSystem *FileSys ) ;
    void SetStartSector ( ULONG StartSector ) ;
    void SetSectorCount ( ULONG SectorCount ) ;
    void SetUsedSectors ( ULONG UsedSectors ) ;
    void SetFSType ( FS_TYPE FSType ) ;
    void SetIsLogical ( BOOL IsLogical ) ;
    void SetIsHidden ( BOOL IsHidden ) ;
    void SetPrev ( VPartitionDisplayInfo *Object ) ;
    void SetNext ( VPartitionDisplayInfo *Object ) ;
    void Remove ( ) ;
    void InsertAfter ( VPartitionDisplayInfo *NewObject ) ;
    VPartitionDisplayInfo *pNext; VPartitionDisplayInfo *pPrev;
    VFileSystem *FileSystem;         ULONG ulStartSector;
    ULONG ulSectorCount;             ULONG ulUsedSectors;
    PART_CLASS usPartitionClass;     FS_TYPE fsType;
    ULONG VolType;                   BOOL bIsLogical;
    BOOL bIsHidden;                  char PartitionTypeName[64];
    ULONG ReSizeSector;
};
```

During an optional editing step 506, the embodiment allows users 100 to edit a list of desired partition 404 operations. For instance, the user 100 may undo at least one operation previously specified by the user 100, or change manipulation parameters (e.g., cluster size, partition size) previously specified in the list. The editing step 506 may include express interactive editing by the user 100 and/or implicit editing through optimization of the command or operation sequence. In other embodiments, editing 506 only includes express list editing by the user 100 and optimization is viewed as a separate step 512 or is not present. More generally, embodiments may group the various method steps described here in different ways and/or label them differently. What matters is whether the functionality described here is present, at the level of specific steps being taken at some point.

During an optional storing step 508, the embodiment stores the list of desired partition operations in persistent storage as user data; the list is retrieved during a step 510. The persistent storage may be on the medium 106, on a program storage medium, or on another medium. File storage and retrieval generally are well known, although their use in the context of virtual engine environments 206 is new. Syntaxes for specifying partition manipulation commands or operations to a real engine 210 are also well known, and can be used to help create commands during storage 508 and to parse commands during retrieval 510. The virtual commands differ from conventional real engine 210 commands in that the virtual commands identify virtual drives 402 and virtual partitions 404, rather than live drives 106 and live partitions 108. For instance, a virtual command may contain a pointer such as the VPartition *Partition pointer.

During an optional optimizing step 512, the embodiment optimizes the list of desired partition manipulation commands or operations. Optimization may be done to reduce the time needed to perform the list during step 516, to optimize storage device 106 use (maximize free space, minimize expected access time during later use of the partitions 108, or pursue other familiar goals), or to promote some combination of the two types of optimization.

Possible optimizations include removing a first set of one or more partition operations that is made redundant by a second, later set of one or more partition operations (e.g., manipulations of a partition that is to be subsequently deleted); reducing the amount of data movement required by a set of partition operations (e.g., replacing a move from A to B followed by a copy back to A with a copy from A to B); redistributing free space on a storage device; increasing free space on a storage device by reducing cluster size; increasing free space on a storage device by converting file system type; and/or specifying (identifying or creating) free space and then creating an operating system partition for installing an operating system, possibly followed by adding the operating system partition to a boot manager structure.

During a consistency checking step 514, the embodiment checks for inconsistencies that could lead to lost or corrupted user data if not detected and fixed. For instance, before performing 516 manipulations on live partitions 108 which correspond to simulated 502 manipulations, the inventive system verifies that the current actual disk configuration 106 matches the configuration in the virtual environment 206 as of the beginning of the simulation. If it does not, the user 100 is notified and no live manipulation based on the simulation will be performed.

The step 514 may also check the virtual environment 206, the live data 104, 108, or both, for file system consistency and integrity and/or partition definition integrity. The discussions of integrity and consistency checks and verification given in the '769 and '472 patents are incorporated herein.

To enforce internal consistency and compliance with the assumptions made by operating systems, one implementation of the invention does the following in connection with step 514. First, a unique state ID is associated with a starting state of a given partition 108, for each partition 108 represented in the virtual environment 206. This state ID is used to link the list of operations to the live partition 108 in that partition's starting state; executing the list on another partition 108 or on the same partition 108 from a different starting state could destroy user data.

Second, the list of operations sent to the real engine 210 for execution (if the user authorizes committing the command(s) to disk during step 516) includes information used by the real engine 210 to verify that the state of the live partition 108 matches the state presumed by the virtual partition 404 in requesting the operation. This can be done by comparing the value of boundaries and other limits to be changed which are provided by the virtual engine environment 206, on the one hand, to either the real engine's data structures (e.g., a partition information list such as that in PowerQuest PM 3.0) or the actual values on disk 106 (e.g., in the partition table 104). Again, the goal is to verify that the live disk 106 organization matches the organization presumed by the virtual engine 400.

Third, the virtual engine 400 relies on limits embedded in the virtual limits objects 412, 414 and on constraints (no nested extended partitions, no overlapping primary partitions, no partitions beyond a disk boundary, etc.) embedded in the virtual engine 400 functions. Compliance with these constraints can be verified during a separate step, or verification can be integrated with a step of documenting free space or the step 510 of retrieving the operations list.

In one implementation, the virtual engine environment 206 includes copies of the system structures such as the file allocation table, and a modified CHKDSK program verifies the integrity and internal consistency of these structures. In another implementation, the file system structures are mainly not copied in the virtual environment 206; only an indication of file system structure characteristics such as file allocation table size and the size of other space allocated by the file system within a partition is maintained in the virtual environment 206. In one embodiment a table of the following information is kept internally by the implementing software, depending on the FAT file system type and/or the specific partition ID: cluster size, minimum partition size, maximum partition size, used and free sectors within the specific partition, used and wasted space within the specific partition.

During a performing step 516, the embodiment performs on the live medium 106 manipulations corresponding to the simulated manipulations (subject to changes in the list made by optimization and by translation from virtual identifiers to live structure identifiers). This is accomplished with the real engine 210, which receives and executes one or more operations provided by the batch manager 208, which in turn creates the live manipulation operations based on the list of simulated commands provided to the virtual engine 400.

FIG. 5 is meant to assist an understanding of the present invention, not to summarize every aspect of the invention or even every method. The methods, signals, systems, and configured storage media of the invention are defined by the claims, in view of the entire specification, not merely by FIG. 5. Steps may be repeated; for instance, steps 500 to 504 may be repeated several times before step 514 occurs. Steps may also be omitted. For instance, any of editing, storing, retrieving, and optimizing steps 506–512 may be omitted (although a storing step 508 is needed before a retrieving step 510). Likewise, one may exit the flowchart of FIG. 5 after the simulation results are provided during step 504, without performing 516 any live manipulations. Steps may also be reordered or done concurrently, unless one step requires the result of a previous step. For instance, one might optimize 512 a list either before or after storing 508 it. Moreover, steps may be grouped differently or renamed. These variations may be present in an embodiment regardless of whether they are expressly described or shown as optional outside the claims.

Signals

Figure 6:
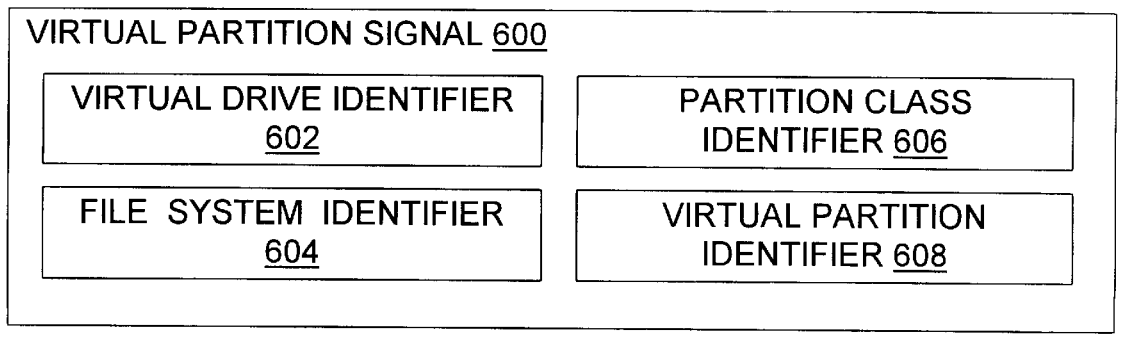
FIG. 6 is a diagram illustrating a virtual partition signal according to the present invention.

FIG. 6 illustrates a virtual partition signal 600 according to the invention. The signal 600 may be embodied in a computer 304 and/or 308 memory, in the storage medium 106, in a separate configured program storage medium, and/or in the wire 306. Other signals according to the invention are defined by the source code excerpts and other descriptions herein, and may likewise be embodied in various physical devices and/or media.

The virtual partition signal 600 may be implemented as part of a VPartition C++ class or similar as shown above or in '213 application. The illustrated signal 600 includes a virtual drive identifier 602 which identifies a virtual drive 402. Unlike a physical drive 106 identifier, the virtual drive identifier 602 may be implemented in the virtual engine environment 206 as a memory pointer (address) or as an index into an array, such as a pointer or index into a list or array of VDrive objects.

The illustrated signal 600 also includes a file system identifier 604 which identifies a file system type. In one embodiment, the identifier 604 either identifies an existing file system such as a FAT file system or it indicates that no file system is yet associated with the virtual partition 404 in question.

The illustrated signal 600 also includes a partition class identifier 606 which identifies a class (primary, logical, or extended) for the virtual partition 404 in question.

Finally, the illustrated signal 600 includes a virtual partition identifier 608 which identifies a virtual partition 404. Unlike a live partition 108 identifier, the virtual partition identifier may be implemented in the virtual engine environment 206 as a memory pointer (address) or as an index into an array, such as a pointer or index into a list or array of VPartition objects.

FIG. 6 is meant to assist an understanding of the present invention, not to summarize every signal of the invention or even every virtual partition signal. The methods, signals, systems, and configured storage media of the invention are defined by the claims, in view of the entire specification, not merely by FIG. 6. Signal components may be repeated; for instance, several virtual partition identifiers 608 may be associated with a given virtual drive identifier 602. Signal components may also be omitted. For instance, if no file system is yet associated with the virtual partition 404 in question, that may be indicated by the lack of a file system identifier 604. Signal components may be stored in different orders or arrangements than that shown, and may be associated by being stored together and/or by links such as a pointer or table index. Moreover, signal components may be grouped differently or renamed. These variations may be present in an embodiment regardless of whether they are expressly described or shown as optional outside the claims.

Additional Implementation Notes

Primary partitions 108 are those appearing in the Master Boot Record ("MBR") partition table 104. Present versions of the partition table 104 limit the number of primary partitions 108 known to an operating system to four, of which only one may be an extended partition 108, but this may be changed in the future and corresponding changes to implementations of the invention will be readily made by those of skill in the art. An extended partition 108 is a primary partition 108 but serves as a shell to hold one or more logical partitions 108. A logical partition 108 must be inside an extended partition 108. An extended partition 108 must be contiguous (it cannot be defined to cover two or more separate sector ranges), and extended partitions 108 may not be nested. Again, these restrictions may change in future operating systems, and corresponding changes may then be made in implementations of the invention.

The first primary partition 108 on the disk 106 (at least under Windows brand and DOS operating systems) is always notched. A "notched" partition is a partition that does not begin in the first sector of a cylinder boundary. Instead, a notched partition normally begins on the second head past the cylinder boundary, that is, one head from the beginning of a cylinder. Logical partitions 108 are always notched. Second, third or fourth primary partitions 108 are not necessarily notched. Care must be taken when manipulating a flat (non-notched) primary 108 to create a logical partition 108, because partition resizing and/or data relocation may be needed to make room for the notch without losing user data. Links between extended partition boot records must also be updated when a logical partition 108 is inserted or deleted.

Active partitions 108 are bootable. Hidden partitions 108 are not assigned a drive letter under various DOS or Windows brand operating systems. Some users 100 would like to have more than four different bootable partitions 108, with the different partitions 108 running different operating systems and/or different versions of an operating system and/or different copies of the same version of a given operating system.

One novel way to do this, either with a virtual environment 206 and a real engine 210 as a pair or merely with a real engine 210, is to coordinate partition 108 manipulation with boot management as follows. The user 100 selects a partition 108 to boot. If the partition 108 is already a primary partition 108, the boot manager boots from that partition 108 in a manner familiar to those of skill in the art. If the partition 108 is a logical partition 108 and one of the four partition table 104 entries is open, then the logical partition 108 is changed to a primary partition 108 and entered in the partition table 104, the extended partition 108 holding the former logical partition 108 is resized to exclude it, and the boot manager boots from the new primary partition 108. If no partition table 104 entry is available, then one of the non-extended primary partitions 108 is moved into the extended partition 108, thereby becoming a logical partition 108 and freeing a partition table 104 entry for use by the partition 108 which is to be booted.

In changing partitions 108 from logical to primary or vice versa, it may be necessary to move or combine partitions 108 so that only one extended and only four or fewer primary partitions 108 are present. For instance, consider a disk 106 containing partitions P1, P2, P3, and E, in that order, where Pn is a non-extended primary partition 108, E is an extended partition 108, and E contains logical partitions 108 L1, L2, L3, and L4 in that order. To boot from L3, the implementing software could make L3 and L4 primaries 108, make P2 and P3 logical partitions 108 in an extended 108 that also contains L1 and L2, and leave P1 as is. The four partition table 104 entries would then identify (i) P1, (ii) an extended partition 108 (containing P2, P3, L1, and L2), (iii) L3, and (iv) L4. L3 would become a primary 108 to be subsequently booted by the boot manager in a familiar manner.

But a similar approach will not work to boot L1 because there are not enough partition table 104 entries. As a bootable primary 108, L1 will need one partition table 104 entry. There are three partitions 108 before L1 and three after it, and only one of the two groups of three partitions 108 can be subsumed into an extended partition 108 that requires only one partition table 104 entry. Thus, five partition table 104 entries would be needed. One solution is to move L1 and then use the approach previously described, with L1 outside the extended partition 108 and enough of the other partitions 108 placed inside the extended partition 108 to bring the number of primary partitions 108 down to four. However, moving a partition 108 may be time-consuming.

Another solution is to create an enhanced partition table 104 used only by the boot manager. Using the enhanced partition table 104, the boot manager tracks the seven partitions 108. Two or more of the partitions 108 are combined into one partition 108 in the regular partition table 104 used by the operating systems. This is safe only if the enhanced partition table 104 is carefully preserved and always referenced during boots; only the boot manager would be used to boot the machine. Otherwise, user 100 or system data may be damaged or lost in a partition 108 that appears in the enhanced partition table 104 but not in the boot-manager-modified regular partition table 104.

One basic control loop for the system shown in FIG. 2 proceeds as follows. First, the system initializes one or more virtual partition objects in the environment 206 by reading values (partition location, class, size, volume label, etc.) from the real engine 210. The real engine 210 should check the MBR for consistency and a correct signature. Next, the virtual engine 400 obtains a user command through the user interface 200. Once the partition(s) 108 involved are identified, the limits on partition manipulation are determined and embedded in virtual limits object(s) 412 and/or 414. The virtual partition 404 being operated on is updated (this is preferred but it may also be destroyed and replaced by a new object with the post-manipulation values). The virtual file system object(s) 408 and 410 are destroyed and a new instance with the specified file system is put in its place.

A given user 100 command may correspond to one or more operations. Typical users specify commands, while the batch manager 208 and the virtual engine 400 generally use operations internally rather than commands. An advanced user 100 may be allowed to manipulate a list of commands during step 506 and/or step 512. To illustrate the difference between commands and operations, and to illustrate other aspects of the invention as well, the following examples are provided.

EXAMPLE ONE

Figure 7:
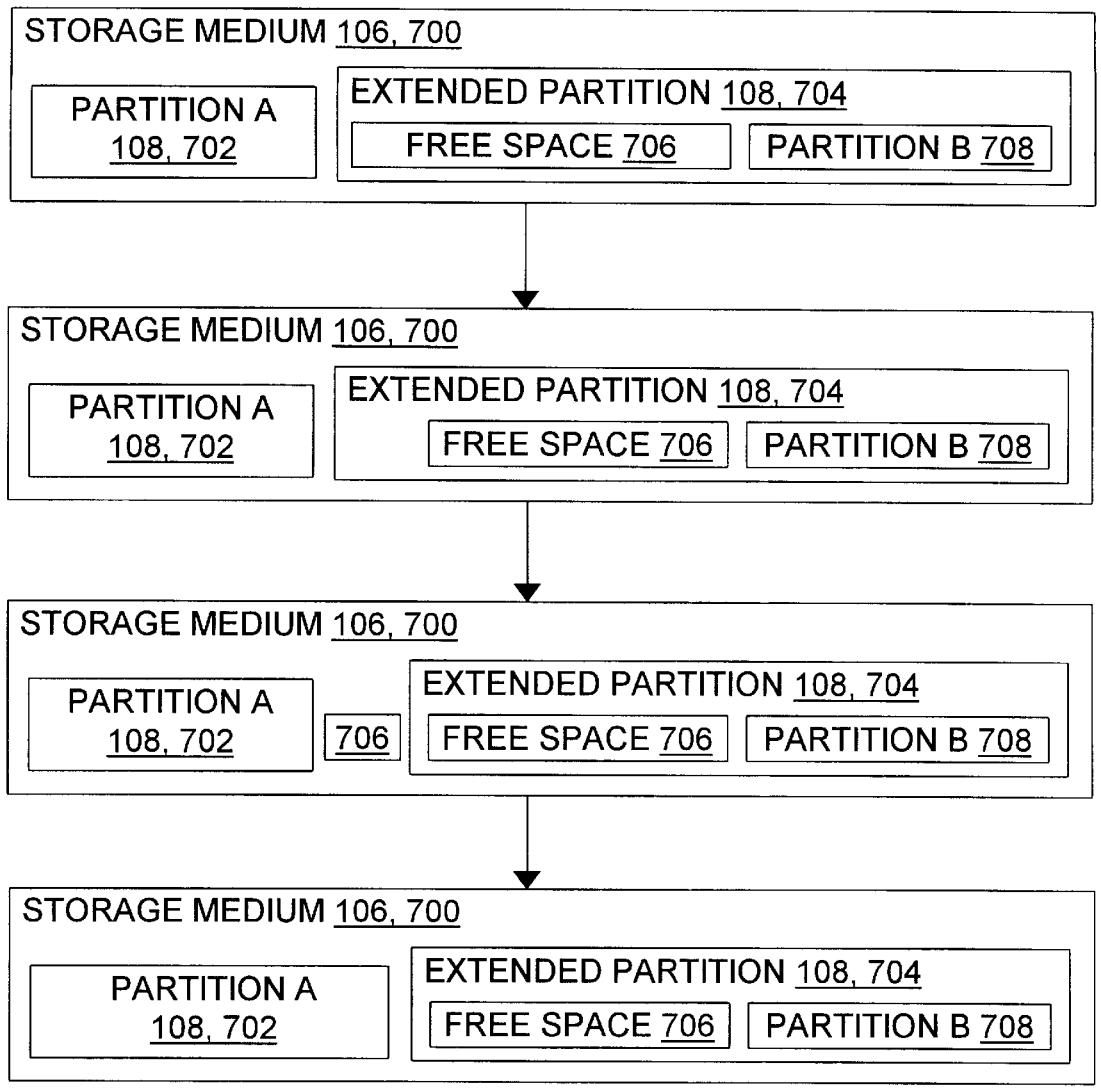
FIG. 7 is a diagram illustrating partition manipulations involving free space inside an extended partition and a second partition outside the extended partition, which are performed to modify the second partition after moving some of the free space out of the extended partition.

Assume a current disk 700 organization similar to that shown at the top of FIG. 7, with a first partition A indicated at 702, an extended partition 704, free space 706, and a second partition 708 (or several partitions 108 where the second partition 708 is shown). Assume further that the user 100 wishes to expand the first partition 702 into the free space 706 located at the right of that partition 702. The corresponding user 100 command may be in the form "expand partition A to the right by 50%" or "grow A by 75 Megabytes" (with growth defaulting to growth to the right), or the user 100 may enter the command through the graphical user interface 200 by dragging, to the right, the right edge of a rectangle which represents partition A.

The virtual engine environment 206 and/or batch manager 208 may translate this single user command into several operations, as illustrated. The first operation resizes the free space 706 by moving its left edge; this is mainly an internal "bookkeeping" operation but it may also be graphically shown to the user 100 to indicate progress toward completion of the command. The second operation resizes the extended partition 704, because otherwise the partition 702 would be partially within and partially outside the extended partition 704 and this would violate the assumptions made by operating systems and place the user's data at risk. The first and second operations may be combined in some embodiments. That is, moving the boundary of an extended partition may automatically also move the corresponding boundary of free space that adjoined the extended partition boundary. Finally, a third operation resizes the partition 702 into the vacated region.

EXAMPLE TWO

Figure 8:
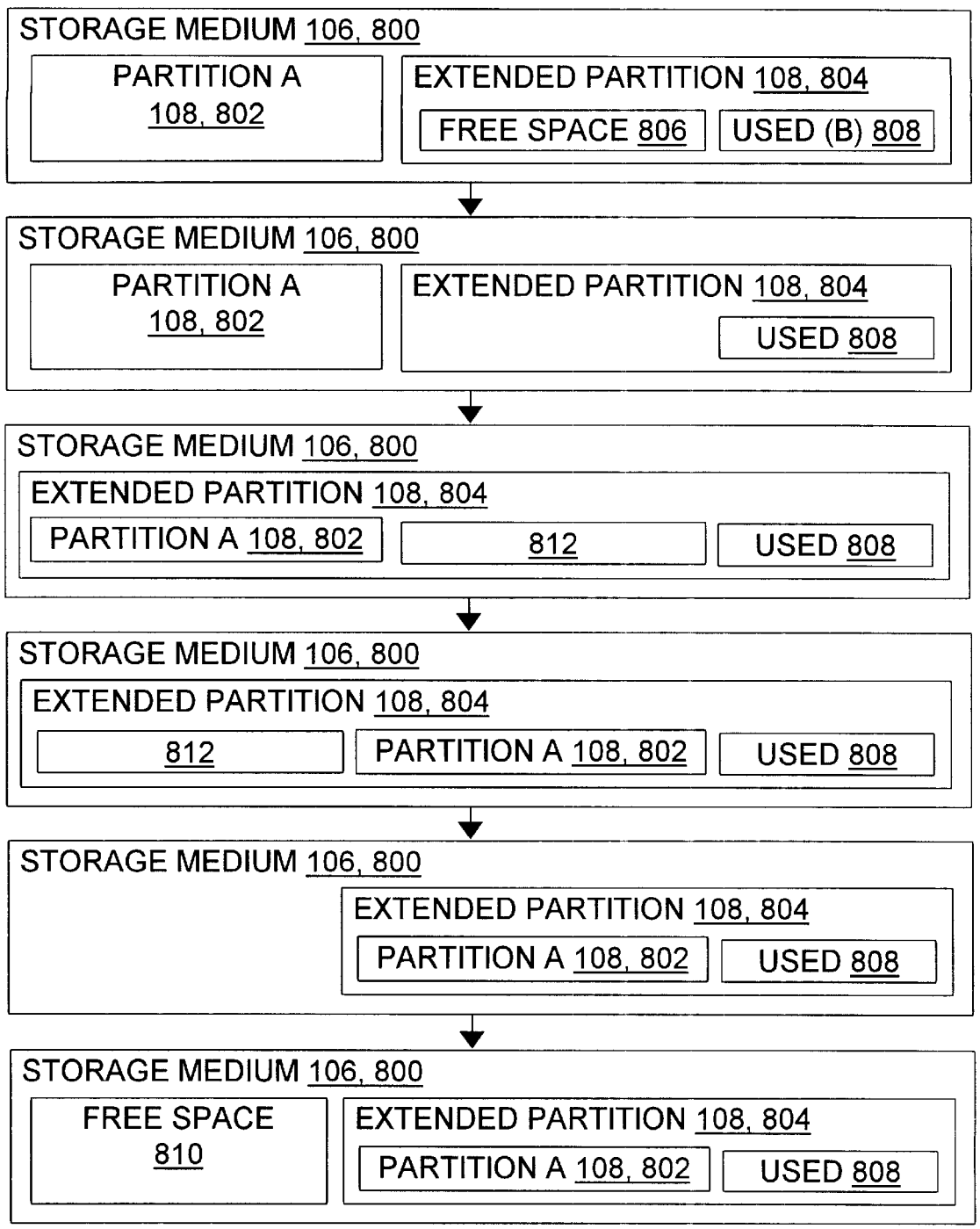
FIG. 8 is a diagram illustrating partition manipulations involving free space inside an extended partition and a second partition outside the extended partition, which are performed at least to bring the second partition inside the extended partition.

Assume a current disk 800 organization similar to that shown at the top of FIG. 8, with a first partition A indicated at 802, an extended partition 804, free space 806, and used space 808 allocated to a partition B and zero or more additional partitions 108. Assume further that the user 100 wishes to move the partition 802 to a location in the extended partition 804 at the left of the used space 808. The corresponding user 100 command may be in the form "move A to the left of B" (with movement across one boundary of an extended partition defaulting to movement into the extended partition), or the user 100 may enter the command through the graphical user interface 200 by dragging the rectangle which represents A into the desired position next to the rectangle that represents B.

The virtual engine environment 206 and/or batch manager 208 translate this single user command into several operations, as illustrated. The first operation removes the free space partition 404/806; since the partition A is larger than the free space 806, merely resizing the free space 806 will not suffice. The extended partition 804 is then resized to enclose both A (still in its original location) and the partition(s) in the used space 808. If the user 100 command had been "make A into a logical partition" then operations could stop at this point.

To continue operations arising from the command "move A to the left of B," partition 802 is moved into the free space represented by the deleted free space partition 404 object in the environment 206. Note that the new location of partition A overlaps the original location, so care must be taken to move data in the correct order to avoid losing user data; one approach starts at the right edge of A and relocates A's data in right-to-left order, so that the data in the overlapped region has been relocated by the time that region is overwritten with a copy of data from the left end of partition A. The extended partition 804 is then resized again to fit snugly around partitions A and B; the default result puts newly freed space that would otherwise be at one end of an extended partition outside the extended partition 804. Finally, a new free space partition object 404/810 is created to represent the space no longer occupied by A.

Alternative embodiments use different operations and/or data structures to accomplish the desired result(s). For instance, assume the states illustrated in FIG. 8 are numbered consecutively, with state 1 being the initial state shown at the top of the Figure, state 2 the next state, and so on. One alternative approach would eliminate state 2, would show free space structures 812 in states 3 and 4, and would eliminate state 5.

It is believed that a commercially available product, marketed under the name "Partition-It" by Quarterdeck Corporation, may be able to grow an extended partition 108 to accommodate growth of a logical partition 108. However, at least as of the filing date of the '213 application, that product was apparently unable to shrink an extended partition 108 to make room for a new primary partition 108 outside and next to the extended partition 108.

In performing a partition 404 move, one implementation of the invention determines the virtual limits captured in structures 412, 414 information and displays those limits to the user through the user interface 200. The move may then be specified in terms of free space desired to the left or right of an existing partition. The virtual partition object 404 corresponding to the moved partition 108 is updated accordingly as part of the move.

EXAMPLE THREE

File systems may also be converted, such as conversion between FAT12 or FAT16 and FAT32 file systems, and conversion from FAT to NTFS or HPFS file systems. Conversion in the context of a real engine 210 only (no virtual engine 400) is known in the art. For instance, Microsoft provides a tool to convert FAT partitions into NTFS partitions, and PowerQuest supports conversion from FAT32 to FAT in its PartitionMagic® 3.0 product (PARTITIONMAGIC is a registered trademark of Power-Quest Corporation).

Within the virtual engine environment 206, conversion involves destroying the virtual file system object 410 and replacing it with an instance of a virtual file system object 410 for the target file system; more details are provided in the code given above and in the '213 application. Like the other examples of virtual partition 404 manipulation, conversion in the virtual engine environment 206 may also involve having the batch manager 208 build a list of one or more operations for possible later execution by the real engine 210 (possibly after optimization by the batch manager 208 or user 100).

EXAMPLE FOUR

A FAT partition 404 is to be copied into free space. After the copy command completes, two copies of the partition 404 will exist in the virtual engine environment 206, and after the copy operation is committed to the disk 106, two copies of the live partition 108 and its contents will exist on the disk or other storage medium 106.

In the virtual environment 206, the FAT partition 108 has a corresponding virtual partition structure 404 and an associated virtual file system structure 410. The free space is represented in the virtual environment 206 as a free space partition 404, and thus has a virtual partition structure and associated virtual file system structure 410 (specifying FAT by default) of its own. By contrast, unformatted partitions 404 represent partitions 108 that exist on disk 106 and have an entry in the MBR or EPBR, and typically have the first sector formatted to contain hexadecimal value 0xF6. Rather than deleting one partition 404 structure and then creating a new one if the logical/primary status is changing, the copy operations simply update the "class" indicator of the free space partition 404 to make it logical or primary. The copy operations also destroy (e.g., remove from any virtual engine environment 206 list and deallocate memory used by) the free space partition's virtual file system object 410, and instantiate a new instance of the virtual file system C++ class, and associate the new instance with the updated virtual partition 404 structure.

At the end of the partition copy command, the implementation scans the virtual environment 206 list of partitions 404, identifying free space and documenting it by creating new free space virtual partition 404 and virtual file system object 408 pairs to represent the free space configuration after the partition is copied. Similar scanning and free space documenting steps are also performed at the end of move, create, delete, and other partition 404 manipulation commands.

In one implementation, the scanning step divides the disk 402 or other storage medium into segments; a list of segments is stored in the virtual environment 206 solely for internal use by the virtual engine 400. Segment boundaries are defined at the edges of existing partitions 404, at size limits imposed by operating systems (e.g., 1024 cylinder boundary), and at the physical edges of the disk 402. Each segment is labeled as primary, extended, or logical, and is also labeled as used or free. Segments that must be "notched" to make room for an MBR are so marked. Finally, the free space partitions 404 are created from corresponding free segments. Maintaining the list of segments makes it easier to create the free space partitions 404 and to manipulate partitions 404 during operations such as those shown in FIG. 8, by providing a separate (from the virtual partitions 404) state information structure that shows boundaries and partition "class."

Partition Creation

Partition 404 creation is performed by taking an existing free space partition 404 structure and changing its type and position/size to that of the parameters specified by the user 100. The associated file system object 410 is destroyed and a new one is created for the specified file system. This file system object 410 is created with default values for the file system type and size. For example, if the user 100 specifies that a new FAT partition be created, the file system will be calculated with the FAT, root directory, and so on having the appropriate sizes for the partition size. Sectors which are used by the file system are calculated and represented to the user 100, as well as free sectors in the partition 404, during step 504.

One method for doing this has a volume object that represented both the partition and the file system, but this is problematic. When creating a new partition, a new volume object has to be created and destroyed repeatedly in order to create a new partition, and then formatted to the correct type. The preferred split architecture discussed at length above, which keeps the partition object and just deletes and instantiates a new file system object, is easier and more efficient.

Partition Formatting

The split architecture, which separates the partition object 404 from the file system object 410, also makes formatting a virtual partition 404 into a simpler operation. The system simply changes the partition type in the MBR entry, and deletes and instantiates a new file system object 410 for the specified file system. This new file system object 410 is then configured to represent the specific file system attributes in the virtual engine environment 206.

Partition Replication

Partition replication is also made easier by the preferred split architecture. The destination partition object 404 is changed to reflect the size of the source partition 404 and the file system object 410 is copied into the destination partition object 410. Situations where drive geometry is different on the source than the destination should be detected and handled. The corresponding partition 108 may need to be resized, but the real engine 210 handles this. All the virtual engine 400 need do is validate the size of the destination partition 404 and replicate the limits 412 of the original partition.

Partition Deletion

Partition deletion comprises deleting the partition object 404 and associated file system object 410, and then deleting and regenerating free space objects in the system. Free space objects 404 should be regenerated because the newly created free space may be adjacent to another free space object which should be merged to create one partition object 404 representing the combined free space.

Partition Resizing

This operation uses the same information obtained from the real engine 210 as is discussed in the '982 application. In particular, the partition minimum and maximum sizes, sectors used, bytes used and wasted are calculated for the partition 404 before the resize is performed. Bytes used and wasted are accounted for as additional information that is only used when performing a cluster analysis and is not always read from the on-disk partition 108 unless it is absolutely necessary for the current operation.

Extended Partition Manipulation With Partition Resizing

Operations on an extended partition 404 (creation if it doesn't already exist, deletion if the adjacent primary partition covers an empty extended partition, or resizing) are executed during manipulation performance 516 before any subsequent operations on the logical or primary partitions 108 involved. This puts the real engine 210 in a valid state to perform 516 the operation on the specified logical or primary partition(s) 108. Care must be taken to delete an extended partition if a primary partition is resized to cover the extended partition.

File System Conversion

This operation takes information from the previous file system object 410 and determines the file system parameters for the new file system type. For FAT to FAT32 conversions, a table of used, min, and max sectors for each cluster size and file system type (FAT16 and FAT32) is kept and used in the conversion to determine the new file system parameters. Conversions from FAT to NTFS require no substantial support in the virtual engine environment 206, since the embodiment simply runs the Microsoft Windows NT conversion program immediately and then reinitializes the virtual engine environment 206. Conversions from FAT to HPFS must go through file-system-specific calculations on the number of files and the total used sectors to determine used and free sectors after the conversion.

Storing a List of Operations

Storage is provided during step 508 for a copy of a list of operations created by the virtual engine 400 to allow optimization 512 and verification 514. As each command is executed by the virtual engine 400, a structure is written which provides verification information about the existing partition 108. After the virtual engine 400 has executed its operations, it communicates to the batch manager 208 to store the operation list and gives it the necessary parameters to complete the operations. The batch manager 208 then uses this information to determine which commands can be optimized. One optimization 512 removes operations that cancel each other, such as deleting a newly created partition. Another optimization removes operations that are superseded by later operations, such as moving the same partition twice.

Undo

A simple undo-everything-in-the-current-user-session operation can be implemented by reinitializing the virtual engine environment 206 from the on-disk structures 104, 108. Step-by-step undo of selected operations requires that the list of operations be read and the last operation be undone by performing the opposite operation (for instance, Hide to undo Unhide, or resize smaller to undo resize larger). Since the list of operations stores the "before" state of the partition this is easily done.

Converting Partition Classes

In order to convert a primary partition to a logical partition, the primary partition must reside adjacent to an extended partition, or there must not be an existing extended partition 108 on the disk 106. If the primary partition is not notched, the partition must first be resized to add the notch, then the extended partition is created or changed to encompass the primary partition. Finally, the MBR entry for the primary partition is deleted and a corresponding EPBR entry is created in the extended partition for the newly converted logical partition. If the primary partition to be converted is the first partition on the disk 106, and starts one head from the beginning of the disk, the partition must be moved or resized to start one head after the beginning of the second cylinder on the disk so the extended partition starts at the beginning of a cylinder.

To convert a logical partition to a primary partition, the logical partition must be the first or last partition in the extended partition. The extended partition will simply be changed to no longer encompass the logical partition, the EPBR entry will be deleted and a corresponding entry will be created in the MBR for the newly created primary partition. If the logical partition occupied all available space in the extended partition, then the extended partition can also be deleted.

Summary

The present invention provides tools and techniques for manipulating virtual partitions in a virtual engine environment without necessarily committing each partition manipulation by actually modifying on-disk system structures. This has several advantages. It allows users to experiment with different manipulations in a safe and efficient manner. It allows systems according to the invention to optimize a sequence of operations by giving the system a more global view of what is to be done. It also allows users to collect operations into a batch list, which is then executed automatically without requiring additional user input at the end of each list entry. The present invention also integrates these virtual operations with existing tools and techniques such as those employed by the PartitionMagic 3.0 program, while expanding those tools and techniques by enhancing the user's ability to manipulate extended partitions and providing better support for remote partition manipulation.

Articles of manufacture within the scope of the present invention include a computer-readable program storage medium in combination with the specific physical configuration of a substrate of the program storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to perform partition manipulation substantially as described herein.

Although particular methods and signal formats embodying the present invention are expressly illustrated and described herein, it will be appreciated that system and configured program storage medium embodiments may be formed according to the signals and methods of the present invention. Unless otherwise expressly indicted, the descriptions herein of methods and signals of the present invention therefore extend to corresponding systems and configured storage media, and the descriptions of systems and program storage media of the present invention extend likewise to corresponding methods and signals.

As used herein, terms such as "a" and "the" and item designations such as "partition" are inclusive of one or more of the indicated item. In particular, in the claims a reference to an item means at least one such item is required. When exactly one item is intended, this document will state that requirement expressly.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for computer partition manipulation, comprising the steps of:
    obtaining from a user at least one user command, each user command corresponding to at least one desired operation on a virtual partition, each virtual partition corresponding at least initially to a live partition on a computer storage medium, each virtual partition having a specified starting sector address and a specified ending sector address, and also having an indication whether the virtual partition is formatted to a file system;
    simulating the performance of at least one of the desired partition operations to obtain simulation results by manipulating the virtual partition without necessarily modifying on-disk system structures that specify the live partition; and
    providing the simulation results to the user.

2. The method of claim 1, wherein the providing step provides the simulation results to a computerized user through a data transfer.

3. The method of claim 1, wherein the providing step provides the simulation results to a human user through a display in a user interface.

4. The method of claim 1, further comprising the step of performing live partition manipulation by modifying at least one on-disk system structure that specifies the live partition on the non-volatile computer storage medium.

5. The method of claim 4, wherein the modified on-disk system structure specifies the size of the live partition in sectors.

6. The method of claim 4, wherein the modified on-disk system structure specifies the cluster size of the live partition.

7. The method of claim 4, wherein the modified on-disk system structure specifies whether the live partition is an extended partition.

8. The method of claim 4, wherein the modified on-disk system structure specifies a file system used within the live partition.

9. The method of claim 1, wherein the obtaining step comprises obtaining the command interactively from a user.

10. The method of claim 1, wherein the command is obtained from a remote user over a communications link, the computer to which the non-volatile computer storage medium is attached is local, and the simulating step locally simulates at least one operation which may be performed locally in response to the remote user's command.

11. The method of claim 1, wherein the command is obtained from a remote user over a communications link, the computer to which the non-volatile computer storage medium is attached is local, and the simulating step remotely simulates at least one operation which may be performed locally in response to the remote user's command.

12. The method of claim 1, wherein the command is obtained from a remote user over a communications link, the computer to which the non-volatile computer storage medium is attached is remote, and the simulating step locally simulates at least one operation which may be performed remotely in response to the remote user's command.

13. The method of claim 1, wherein the command is obtained from a remote user over a communications link, the computer to which the non-volatile computer storage medium is attached is remote, and the simulating step remotely simulates at least one operation which may be performed remotely in response to the remote user's command.

14. The method of claim 1, wherein the simulating step includes simulated partition creation.

15. The method of claim 14, wherein the simulating step creates a simulated logical partition.

16. The method of claim 14, wherein the simulating step creates a simulated primary partition.

17. The method of claim 14, wherein the simulating step creates a simulated extended partition.

18. The method of claim 1, wherein the simulating step includes simulated partition formatting.

19. The method of claim 1, wherein the simulating step includes simulated partition replication.

20. The method of claim 1, wherein the simulating step includes simulated partition deletion.

21. The method of claim 1, wherein the simulating step includes simulated partition resizing by changing the number of sectors in a simulated partition.

22. The method of claim 1, wherein the simulating step includes simulated partition resizing by changing the cluster size of a simulated partition.

23. The method of claim 1, wherein the simulating step includes changing the root directory size of a simulated partition.

24. The method of claim 1, wherein the simulating step includes simulated partition resizing by changing the size of a simulated extended partition in connection with resizing a simulated logical partition within the simulated extended partition.

25. The method of claim 1, wherein the simulating step includes simulated partition resizing by expanding a simulated extended partition into free space obtained by manipulating a simulated partition outside the simulated extended partition.

26. The method of claim 1, wherein the simulating step includes renaming a simulated partition.

27. The method of claim 1, wherein the simulating step includes simulated partition conversion by changing the file system type of a simulated partition.

28. The method of claim 27, wherein the conversion changes file system type between FAT16 and FAT32 file systems.

29. The method of claim 27, further comprising the step of displaying an indication of the simulated partition's free space after the conversion.

30. The method of claim 27, further comprising the step of displaying an indication of the simulated partition's used space after the conversion.

31. The method of claim 1, wherein the simulating step includes changing the hidden status of a simulated partition.

32. The method of claim 1, wherein the simulating step includes changing the active status of a simulated partition.

33. The method of claim 1, wherein the simulating step inserts a placeholder in a list of desired partition operations for a step of verifying the integrity and consistency of live internal file system data.

34. The method of claim 1, wherein the simulating step inserts a placeholder in a list of desired partition operations for a step of testing for bad sectors in a live partition.

35. The method of claim 1, further comprising the steps of obtaining a partition constraint from the user and enforcing the partition constraint during the simulating step.

36. The method of claim 35, wherein the partition constraint specifies whether a partition can be moved.

37. The method of claim 35, wherein the partition constraint specifies whether a partition can be resized.

38. The method of claim 1, wherein the simulating step updates a virtual engine environment data structure in computer memory and the method further comprises storing the virtual engine environment data structure in persistent storage as user data.

39. The method of claim 1, further comprising the step of editing a list of desired partition operations.

40. The method of claim 39, further comprising the step of storing the list of desired partition operations in persistent storage as user data.

41. The method of claim 39, wherein the editing step comprises interactive editing by the user.

42. The method of claim 41, wherein the interactive editing undoes at least one operation previously specified by the user.

43. The method of claim 39, wherein the editing step comprises computer-implemented optimization of the list to reduce the time needed to perform the list.

44. The method of claim 43, wherein the optimization removes a first set of one or more partition operations that is made redundant by a second, later set of one or more partition operations.

45. The method of claim 43, wherein the optimization reduces the amount of data movement required by a set of partition operations.

46. The method of claim 1, further comprising the computer-implemented step of optimizing the list of desired partition operations to optimize storage device use.

47. The method of claim 46, wherein the optimized list redistributes free space on the storage device.

48. The method of claim 46, wherein the optimized list increases free space on the storage device by reducing cluster size.

49. The method of claim 46, wherein the optimized list increases free space on the storage device by converting file system type.

50. The method of claim 46, wherein the optimized list specifies free space and then creates an operating system partition for installing an operating system.

51. The method of claim 50, wherein the optimized list adds the operating system partition to a boot manager structure.

52. The method of claim 1, further comprising the step of verifying the integrity and consistency of live internal file system data.

53. The method of claim 1, further comprising the step of verifying the integrity and consistency of partition size and position relative to a storage device boundary.

54. The method of claim 1, further comprising the step of verifying the integrity and consistency of partition size and position relative to another partition.

55. The method of claim 1, further comprising a portion of the step of performing live partition manipulation, wherein the performing step is interrupted.

56. The method of claim 55, wherein the computer is forcibly rebooted before completion of the performing step.

57. A computer program storage medium having a configuration that represents data and instructions which will cause at least a portion of a computer system to perform method steps for partition manipulation, the method steps comprising the steps of:

obtaining from a user at least one user command, each user command corresponding to at least one desired operation on a virtual partition, each virtual partition corresponding at least initially to a live partition on a non-volatile computer storage device;

simulating the performance of at least one of the desired partition operations to obtain simulation results by manipulating the virtual partition without necessarily modifying on-device system structures that specify the live partition; and providing the simulation results to the user.

58. The configured program storage medium of claim 57, wherein the method further comprises the step of performing at least partial manipulation of a live partition by modifying at least one on-device system structure that specifies the live partition on the non-volatile storage device.

59. The configured program storage medium of claim 58, wherein the performing step is started in response to a user command received from a remote computer over a communications link.

60. The configured program storage medium of claim 58, wherein the simulating step updates a virtual engine data structure in computer memory and the performing step updates a corresponding data structure on the non-volatile storage device.

61. The configured program storage medium of claim 60, wherein the data structure on the non-volatile storage device includes a partition table.

62. The configured program storage medium of claim 60, wherein the data structure on the non-volatile storage device includes a file allocation table.

63. The configured program storage medium of claim 60, wherein the data structure on the non-volatile storage device includes a boot record.

64. The configured program storage medium of claim 60, wherein the data structure on the non-volatile storage device includes a root directory.

65. The configured program storage medium of claim 60, wherein the virtual engine data structure specifies a starting sector address and a sector count for a virtual partition.

66. The configured program storage medium of claim 65, wherein the virtual engine data structure specifies a file system type for the virtual partition.

67. The configured program storage medium of claim 60, wherein the virtual engine data structure specifies a total directory count and a total file count for the virtual partition.

68. The configured program storage medium of claim 60, wherein the virtual engine data structure specifies a cluster size for the virtual partition.

69. The configured program storage medium of claim 60, wherein the virtual engine data structure specifies a geometry for a virtual drive.

70. The configured program storage medium of claim 58, wherein the performing step comprises receiving an identification of the simulated partition operation over a communications link.

71. The configured program storage medium of claim 58, further comprising the step of undoing an operation previously done during at least one of the simulating step and the performing step.

72. The configured program storage medium of claim 71, wherein the undoing step undoes a partition creation operation.

73. The configured program storage medium of claim 71, wherein the undoing step undoes a partition deletion operation.

74. The configured program storage medium of claim 71, wherein the undoing step undoes a partition replication operation.

75. The configured program storage medium of claim 71, wherein the undoing step undoes a partition resizing operation.

76. The configured program storage medium of claim 71, wherein the undoing step undoes a partition free space redistribution operation.

77. The configured program storage medium of claim 71, wherein the undoing step undoes a partition renaming operation.

78. The configured program storage medium of claim 71, wherein the undoing step undoes a partition file type conversion operation.

79. A computer partition manipulation system comprising:

- an interface to obtain from a user a command which corresponds to at least one desired partition operation on a simulated partition and to provide simulation results to the user, the simulated partition having a specified starting sector address and a specified ending sector address, and also having an indication whether the simulated partition is formatted to a file system;
- at least one processor; and
- a memory accessible to the processor and configured by data and instructions forming a virtual engine environment structure whereby the system simulates performance of at least one desired partition operation.

80. The system of claim 79, further comprising a real engine for manipulation of live partitions on a non-volatile computer storage medium, the real engine in operable communication with the system whereby the real engine accepts commands previously supplied by the interface to the virtual engine environment.

81. The system of claim 80, wherein the real engine comprises an application program that runs in alternate execution mode.

82. The system of claim 80, wherein the system comprises a batch manager that supplies a list of operations to the real engine.

83. The system of claim 79, wherein the interface comprises a communications link for communication with a remote computer.

84. The system of claim 83, wherein the storage medium is directly attached to the same computer as the virtual engine data structure.

85. The system of claim 83, wherein the storage medium is directly attached to the remote computer.

86. The system of claim 79, wherein the virtual engine environment structure includes a virtual partition.

87. The system of claim 79, wherein the virtual engine environment structure includes a virtual drive.

88. The system of claim 79, wherein the virtual engine environment structure includes a virtual file system object.

89. The system of claim 79, wherein the virtual engine environment structure includes a virtual file system limits object.

90. The system of claim 80, wherein the system comprises a means for performing live partition creation.

91. The system of claim 90, wherein the means for performing live partition creation creates a live partition on a remote computer by way of a communications link.

92. The system of claim 80, wherein the system comprises a means for simulating partition replication.

93. The system of claim 92, wherein the system further comprises a means for performing live partition replication.

94. The system of claim 93, wherein the means for performing live partition replication replicates a live partition on a remote computer by way of a communications link.

95. The system of claim 80, wherein the system simulates a desired partition operation of partition resizing by changing the number of sectors in a simulated partition.

96. The system of claim 95, wherein the system performs live partition resizing by changing the number of sectors in a live partition on the non-volatile computer storage medium.

97. The system of claim 96, wherein the system resizes the live partition on a remote computer by way of a communications link.

98. The system of claim 80, wherein the system simulates a desired partition operation of partition resizing by changing the cluster size of a simulated partition.

99. The system of claim 98, wherein the system further comprises means for performing live partition resizing by changing the cluster size of a live partition.

100. The system of claim 99, wherein the means for performing live partition resizing resizes the live partition on a remote computer by way of a communications link.

101. The system of claim 79, further comprising a means for editing a list of desired partition operations.

102. The system of claim 99, wherein the means for editing a list of desired partition operations comprises computer-implemented means for optimizing the list to reduce the time needed to perform the list.

103. The system of claim 79, further comprising a means for coordinating partition manipulation with boot management, whereby a user selects a live partition to boot; if the selected partition is already a primary partition then the boot manager boots from that partition; if the selected partition is a logical partition and a partition table entry is open then the selected logical partition is changed to a primary partition and entered in the partition table, an extended partition holding the former logical partition is resized to exclude it, and the boot manager boots from the new primary partition; and if no partition table entry is available, then a non-extended primary partition is moved into the extended partition, thereby becoming a logical partition and freeing a partition table entry for use by the selected partition which is to be booted.

104. The system of claim 79, comprising at least two computers connected by a communications link, the interface running at least in part on one of the computers and the virtual engine environment residing at least in part on the other computer.

105. The system of claim 79, wherein the system comprises a means for converting a primary partition to a logical partition.

106. The system of claim 79, wherein the system comprises a means for converting a logical partition to a primary partition.

* * * * *

UNITED STATES PATENT AND TRADEMARK OFFICE
CERTIFICATE OF CORRECTION

| | |
|---|---|
| PATENT NO. | : 6,330,653 B1 |
| DATED | : December 11, 2001 |
| INVENTOR(S) | : Golden E. Murray et al. |

It is certified that error appears in the above-identified patent and that said Letters Patent is hereby corrected as shown below:

Claim 102 depends from claim 101.
Claim 66 depends from claim 60

Signed and Sealed this

Twenty-third Day of April, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,330,653 B1
DATED         : December 11, 2001
INVENTOR(S)   : Golden E. Murray et al.

Page 1 of 1

It is certified that error appears in the above-identified patent and that said Letters Patent is hereby corrected as shown below:

<u>Column 48,</u>
Line 33, claim 66, depends from claim 60.

<u>Column 50,</u>
Line 26, claim 102 depends from claim 101.

Signed and Sealed this

Thirtieth Day of April, 2002

Attest:

Attesting Officer

JAMES E. ROGAN
Director of the United States Patent and Trademark Office